(12) United States Patent
Deats et al.

(10) Patent No.: US 10,223,733 B2
(45) Date of Patent: Mar. 5, 2019

(54) PROVIDING CONSOLIDATED ORDER MANAGEMENT

(71) Applicant: Bank of America Corporation, Charlotte, NC (US)

(72) Inventors: James J. Deats, Jacksonville, FL (US); Valerie J. Redmond, Jacksonville, FL (US); Ninoshka F. Vargas, Jacksonville, FL (US); Joe A. Andrews, Jacksonville, FL (US); Jeffrey J. Donnelly, St. Augustine, FL (US); John C. Savas, Pennington, NJ (US); Suchitra Ravilla, Pennington, NJ (US)

(73) Assignee: Bank of America Corporation, Charlotte, NC (US)

( * ) Notice: Subject to any disclaimer, the term of this patent is extended or adjusted under 35 U.S.C. 154(b) by 657 days.

(21) Appl. No.: 14/755,878

(22) Filed: Jun. 30, 2015

(65) Prior Publication Data
US 2017/0004565 A1    Jan. 5, 2017

(51) Int. Cl.
*G06Q 30/00* (2012.01)
*G06Q 30/06* (2012.01)

(52) U.S. Cl.
CPC ................ *G06Q 30/0635* (2013.01)

(58) Field of Classification Search
CPC ................ G06Q 40/02; G06F 17/60
See application file for complete search history.

(56) References Cited

U.S. PATENT DOCUMENTS

| | | | |
|---|---|---|---|
| 6,067,525 | A  | 5/2000 | Johnson et al. |
| 6,278,982 | B1 | 8/2001 | Korhammer et al. |
| 6,532,460 | B1 | 3/2003 | Amanat et al. |
| 6,654,726 | B1 | 11/2003 | Hanzek |
| 6,766,304 | B2 | 7/2004 | Kemp, II et al. |
| 6,772,132 | B1 | 8/2004 | Kemp, II et al. |
| 6,938,011 | B1 | 8/2005 | Kemp, II et al. |
| 6,980,963 | B1 | 12/2005 | Hanzek |

(Continued)

OTHER PUBLICATIONS

Oct. 6, 2017 U.S. Non-Final Office Action—U.S. Appl. No. 14/755,591.

(Continued)

*Primary Examiner* — Talia F Crawley
(74) *Attorney, Agent, or Firm* — Banner & Witcoff, Ltd.; Michael A. Springs

(57) ABSTRACT

Methods, systems, and computer-readable media for providing consolidated order management are presented. In some embodiments, a computer system may receive, from a first organization user computing device, first order information associated with a first order created on the first organization user computing device. Subsequently, the computer system may validate the first order information. Based on validating the first order information, the computer system may load a first set of one or more routing rules from a consolidated order management database. Thereafter, the computer system may route the first order information associated with the first order created on the first organization user computing device and received from the first organization user computing device based on the first set of one or more routing rules loaded from the consolidated order management database.

20 Claims, 26 Drawing Sheets

(56) References Cited

U.S. PATENT DOCUMENTS

| | | |
|---|---|---|
| 7,089,205 B1 | 8/2006 | Abernethy |
| 7,110,969 B1 | 9/2006 | Bennett et al. |
| 7,110,975 B2 | 9/2006 | Marks de Chabris et al. |
| 7,127,424 B2 | 10/2006 | Kemp, II et al. |
| 7,136,834 B1 | 11/2006 | Merrin et al. |
| 7,181,424 B1 | 2/2007 | Ketchum et al. |
| 7,191,137 B1 | 3/2007 | Berlin et al. |
| 7,212,994 B2 | 5/2007 | Howell et al. |
| 7,222,093 B2 | 5/2007 | Block et al. |
| 7,228,289 B2 | 6/2007 | Brumfield et al. |
| 7,475,147 B2 | 1/2009 | Saito et al. |
| 7,529,704 B1 * | 5/2009 | Breslow ............... G06Q 40/04 705/37 |
| 7,752,123 B2 | 7/2010 | Brookfield et al. |
| 8,140,420 B2 * | 3/2012 | Buckwalter ........... G06Q 40/00 705/35 |
| 8,255,315 B1 | 8/2012 | May |
| 8,374,950 B1 | 2/2013 | May |
| 8,468,090 B2 * | 6/2013 | Lesandro ............... G06Q 20/10 705/35 |
| 8,744,949 B2 * | 6/2014 | Buckwalter ........... G06Q 40/00 705/36 R |
| 9,552,226 B1 | 1/2017 | Norbeck, Jr. et al. |
| 10,078,862 B2 * | 9/2018 | Deats ................. G06Q 30/0641 |
| 2003/0004813 A1 | 1/2003 | Arroyo et al. |
| 2003/0139978 A1 | 7/2003 | Fisher et al. |
| 2003/0177082 A1 * | 9/2003 | Buckwalter ........... G06Q 40/00 705/36 R |
| 2004/0148244 A1 | 7/2004 | Badeau et al. |
| 2004/0194069 A1 * | 9/2004 | Surasinghe ............... G06F 8/30 717/136 |
| 2005/0102302 A1 | 5/2005 | Marr |
| 2006/0075396 A1 * | 4/2006 | Surasinghe ............... G06F 8/70 717/168 |
| 2007/0025542 A1 | 2/2007 | Bushey |
| 2008/0154764 A1 | 6/2008 | Levine et al. |
| 2008/0249952 A1 | 10/2008 | Benteler |
| 2009/0030814 A1 | 1/2009 | Caballero et al. |
| 2009/0144109 A1 | 6/2009 | Knight |
| 2011/0178915 A1 * | 7/2011 | Vinokour ............... G06Q 40/04 705/37 |
| 2011/0258068 A1 | 10/2011 | Asher et al. |
| 2012/0054095 A1 * | 3/2012 | Lesandro ............... G06Q 20/10 705/39 |
| 2012/0143745 A1 * | 6/2012 | Buckwalter ........... G06Q 40/00 705/37 |
| 2014/0006306 A1 | 1/2014 | Koshy |
| 2014/0149283 A1 * | 5/2014 | Roselli ................... G06Q 20/10 705/39 |
| 2014/0229270 A1 | 8/2014 | Rashwan |
| 2015/0073966 A1 * | 3/2015 | Buckwalter ........... G06Q 40/00 705/37 |

OTHER PUBLICATIONS

Dec. 6, 2016 U.S. Non-Final Office Action—U.S. Appl. No. 14/755,735.
Jun. 16, 2017 U.S. Final Office Action—U.S. Appl. No. 14/755,735.
Oct. 25, 2017 U.S. Non-Final Office Action—U.S. Appl. No. 14/755,735.
May 31, 2018 U.S. Non-Final Office Action—U.S. Appl. No. 14/755,993.
Jan. 22, 2018 U.S. Non-Final Office Action—U.S. Appl. No. 14/788,023.
Feb. 8, 2018 U.S. Final Office Action—U.S. Appl. No. 14/755,735.
Lu, Shuo, "Architecture design and access control of e-Health portals," ProQuest Dissertations and Theses; 2008; PreQuest Dissertations & Theses Global, 79 pages.
May 23, 2018 U.S. Notice of Allowance—U.S. Appl. No. 14/755,591.
Aug. 2, 2018 U.S. Final Office Action—U.S. Appl. No. 14/788,023.

* cited by examiner

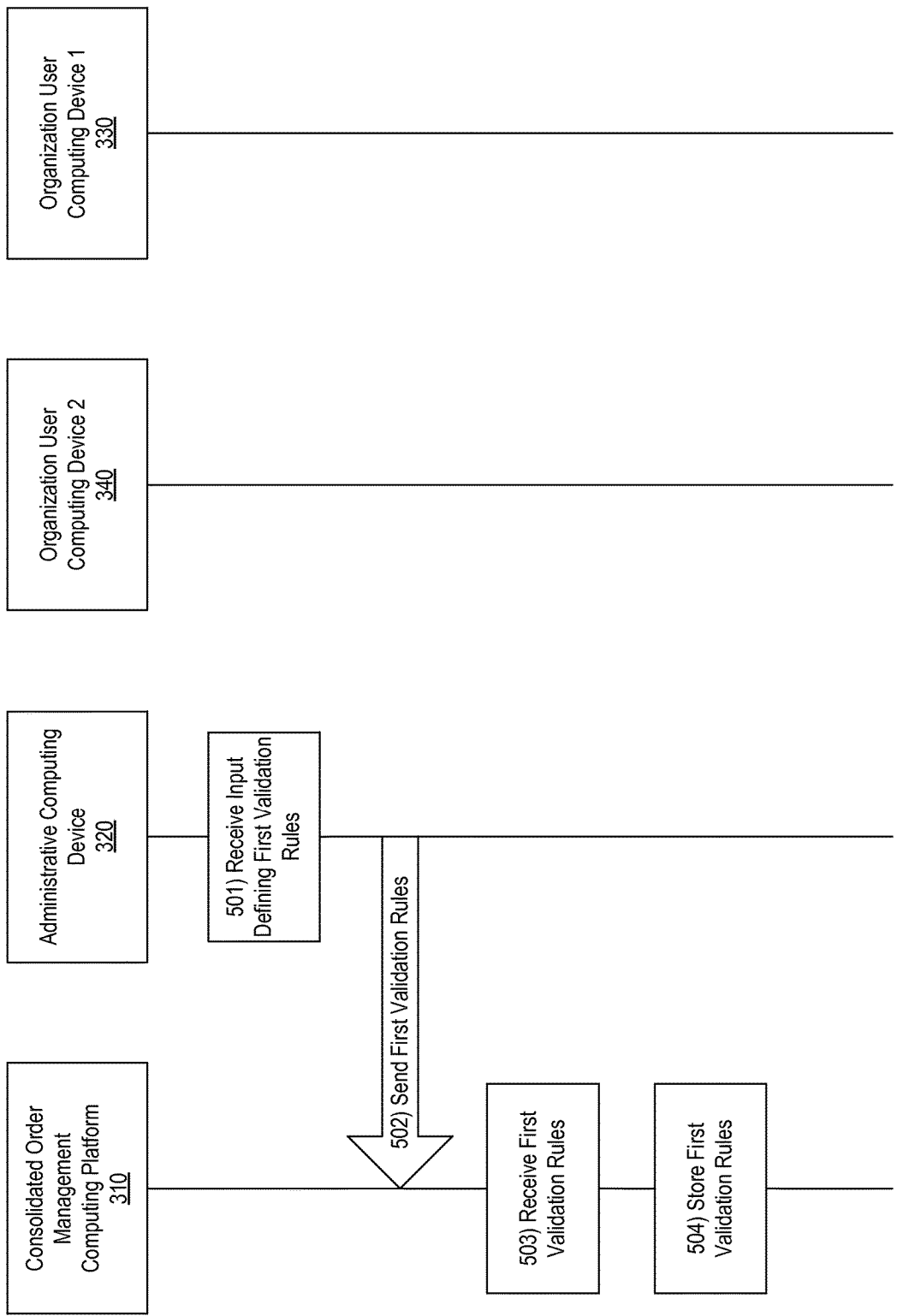

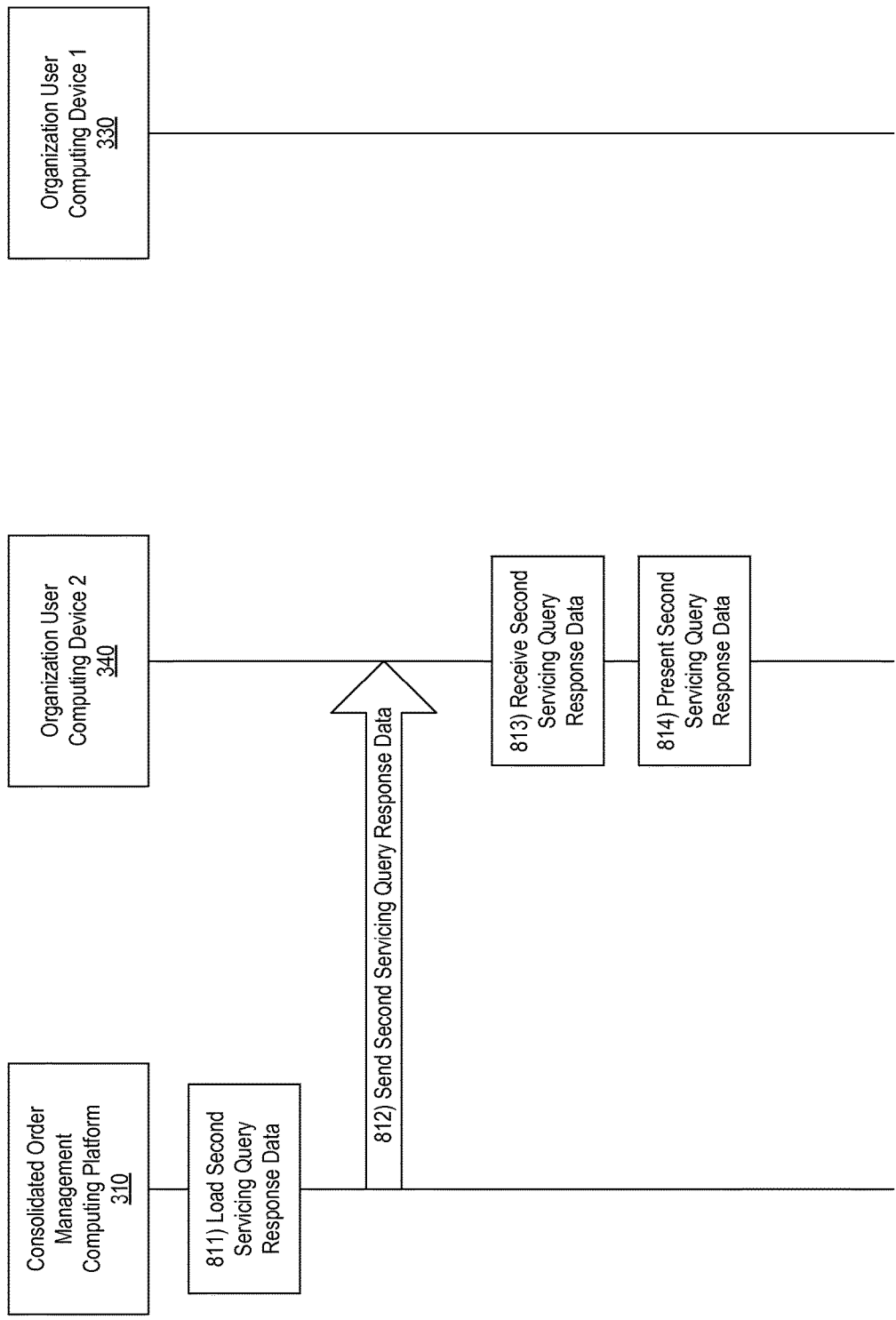

PROVIDING CONSOLIDATED ORDER MANAGEMENT

BACKGROUND

Aspects of the disclosure relate to computer hardware and software. In particular, one or more aspects of the disclosure generally relate to computer hardware and software for providing consolidated order management.

Large organizations, such as financial institutions and other large enterprise organizations, may provide many different products and/or services to many customers across many various channels. To support these complex and large-scale operations, a large organization may own, operate, and/or maintain many disparate computer systems so as to service various different customers in connection with different products and services and across different channels of its business. As a result of this complexity, it may be difficult for a large organization, such as a financial institution, to efficiently, effectively, and uniformly manage how various different products and/or services are provided to different customers across different channels.

SUMMARY

Aspects of the disclosure relate to computer systems that provide effective, efficient, scalable, and convenient ways of uniformly managing how different products and/or services are provided to different customers across different channels of an organization, such as a financial institution.

For example, one or more aspects of the disclosure relate to a consolidated order management system that performs various functions, including maintaining a consolidated order management database. As illustrated in greater detail below, the consolidated order management database maintained by the consolidated order management system may centrally maintain order information, account information, rules information, historical information, and/or other information for many different products, channels, and/or customers of an organization, such as a financial institution. Advantageously, by maintaining such information in a consolidated order management database in accordance with one or more aspects discussed in greater detail below, and organization may be able to more efficiently, effectively, and uniformly manage how different products and/or services are provided to different customers across different channels of the organization's business.

For instance, a financial institution may provide various wealth management products and/or services, such as securities investment and trading products and/or services, to various customers across various channels of the financial institution's business. If a regulatory change is made that affects multiple products and/or services and/or different channels of the business, the financial institution might only need to make a single change in the consolidated order management system discussed in greater detail below to implement the regulatory change, rather than having to make multiple changes in multiple different systems that might otherwise be used to support the various different products and/or services that may be provided by the financial institution to different customers across different channels.

One or more aspects of the disclosure relate to providing consolidated order management using consolidated order interfaces. For example, in accordance with one or more embodiments, a consolidated order management computing platform having at least one processor, a memory, and a communication interface may receive, via the communication interface, and from a first organization user computing device, a first request for a first order user interface. Based on receiving the first request for the first order user interface from the first organization user computing device, the consolidated order management computing platform may load first interface information from a consolidated order management database. Subsequently, the consolidated order management computing platform may generate a first order interface based on the first interface information loaded from the consolidated order management database. Then, the consolidated order management computing platform may send, via the communication interface, and to the first organization user computing device, the first order interface generated based on the first interface information loaded from the consolidated order management database.

One or more aspects of the disclosure relate to providing consolidated order management using consolidated validation rules. For example, in accordance with one or more embodiments, a consolidated order management computing platform having at least one processor, a memory, and a communication interface may receive, via the communication interface, and from an administrative computing device associated with an organization, a first set of one or more validation rules. Based on receiving the first set of one or more validation rules from the administrative computing device associated with the organization, the consolidated order management computing platform may store the first set of one or more validation rules received from the administrative computing device associated with the organization in a consolidated order management database. Subsequently, the consolidated order management computing platform may receive, via the communication interface, and from a first organization user computing device, first order information associated with a first order created on the first organization user computing device. Thereafter, the consolidated order management computing platform may validate the first order information received from the first organization user computing device based on the first set of one or more validation rules stored in the consolidated order management database. Based on validating the first order information received from the first organization user computing device based on the first set of one or more validation rules stored in the consolidated order management database, the consolidated order management computing platform may send, via the communication interface, to the first organization user computing device, first validation results information. Subsequently, the consolidated order management computing platform may process the first order information received from the first organization user computing device based on the first validation results information.

One or more aspects of the disclosure relate to providing consolidated order management using consolidated routing rules. For example, in accordance with one or more embodiments, a consolidated order management computing platform having at least one processor, a memory, and a communication interface may receive, via the communication interface, and from a first organization user computing device, first order information associated with a first order created on the first organization user computing device. Subsequently, the consolidated order management computing platform may validate the first order information associated with the first order created on the first organization user computing device and received from the first organization user computing device. Based on validating the first order information associated with the first order created on the first organization user computing device and received from the first organization user computing device, the consolidated order management computing platform may load a first set of one or more routing rules from a consolidated order management database. Thereafter, the consolidated order management computing platform may route the first order information associated with the first order created on the first organization user computing device and received from the first organization user computing device based on the first set of one or more routing rules loaded from the consolidated order management database.

One or more aspects of the disclosure relate to providing consolidated order management using consolidated order inquiry tools. For example, in accordance with one or more embodiments, a consolidated order management computing platform having at least one processor, a memory, and a communication interface may receive, via the communication interface, and from a first organization user computing device, first order inquiry information associated with a first order created on the first organization user computing device. Based on receiving the first order inquiry information associated with the first order created on the first organization user computing device from the first organization user computing device, the consolidated order management computing platform may load first order status information from a consolidated order management database. Subsequently, the consolidated order management computing platform may send, via the communication interface, and to the first organization user computing device, the first order status information loaded from the consolidated order management database.

One or more aspects of the disclosure relate to providing consolidated order management using consolidated servicing tools. For example, in accordance with one or more embodiments, a consolidated order management computing platform having at least one processor, a memory, and a communication interface may receive, via the communication interface, and from a first organization user computing device, first servicing query information corresponding to a first query associated with a first set of completed orders. Based on receiving the first servicing query information corresponding to the first query associated with the first set of completed orders from the first organization user computing device, the consolidated order management computing platform may load first servicing query response data from a consolidated order management database. Subsequently, the consolidated order management computing platform may send, via the communication interface, and to the first organization user computing device, the first servicing query response data loaded from the consolidated order management database.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 5A-5D depict an illustrative event sequence for providing consolidated order management using consolidated validation rules in accordance with one or more example embodiments;

FIGS. 8A-8C depict an illustrative event sequence for providing consolidated order management using consolidated servicing tools in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
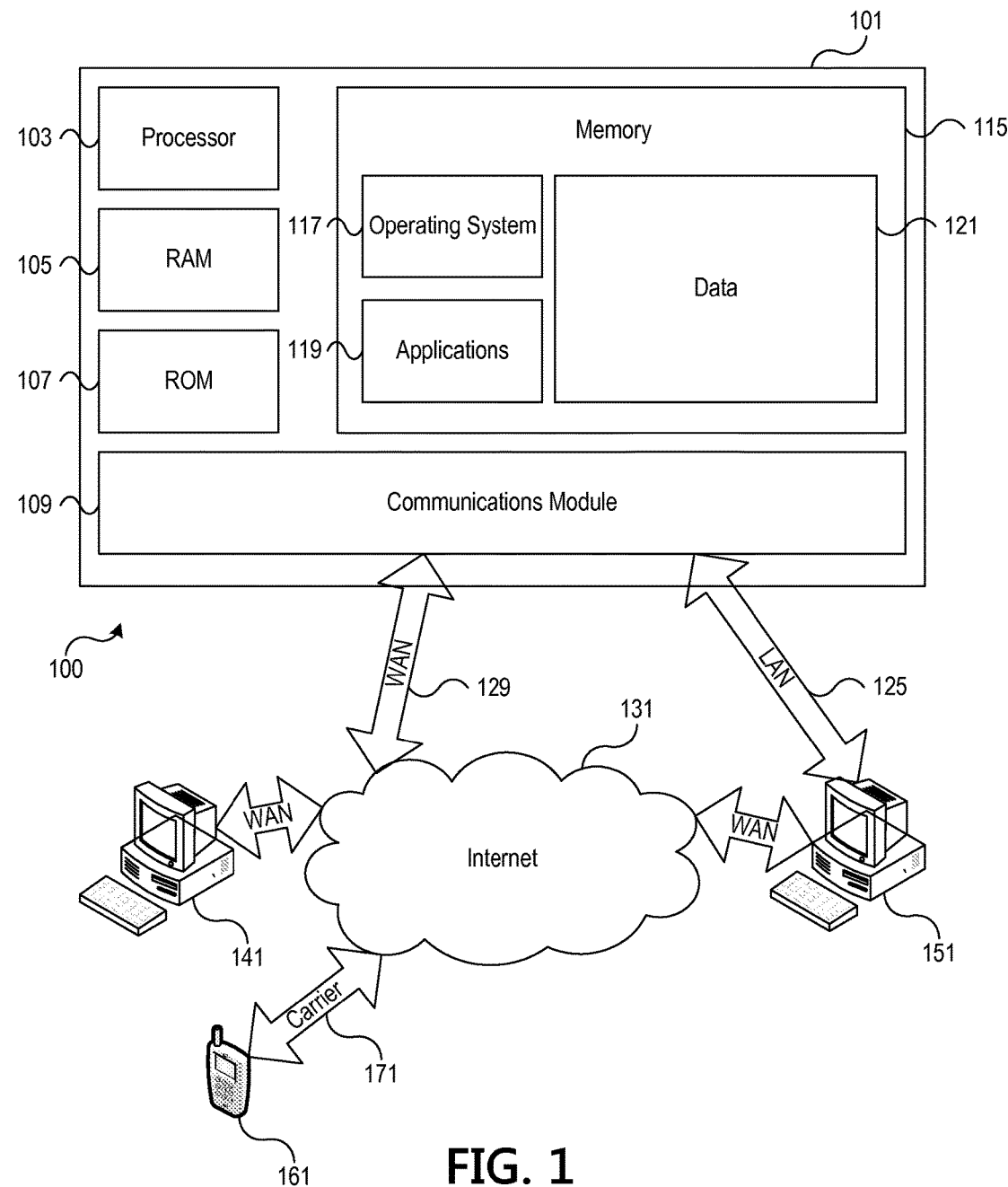
FIG. 1 depicts an illustrative operating environment in which various aspects of the disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks) are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
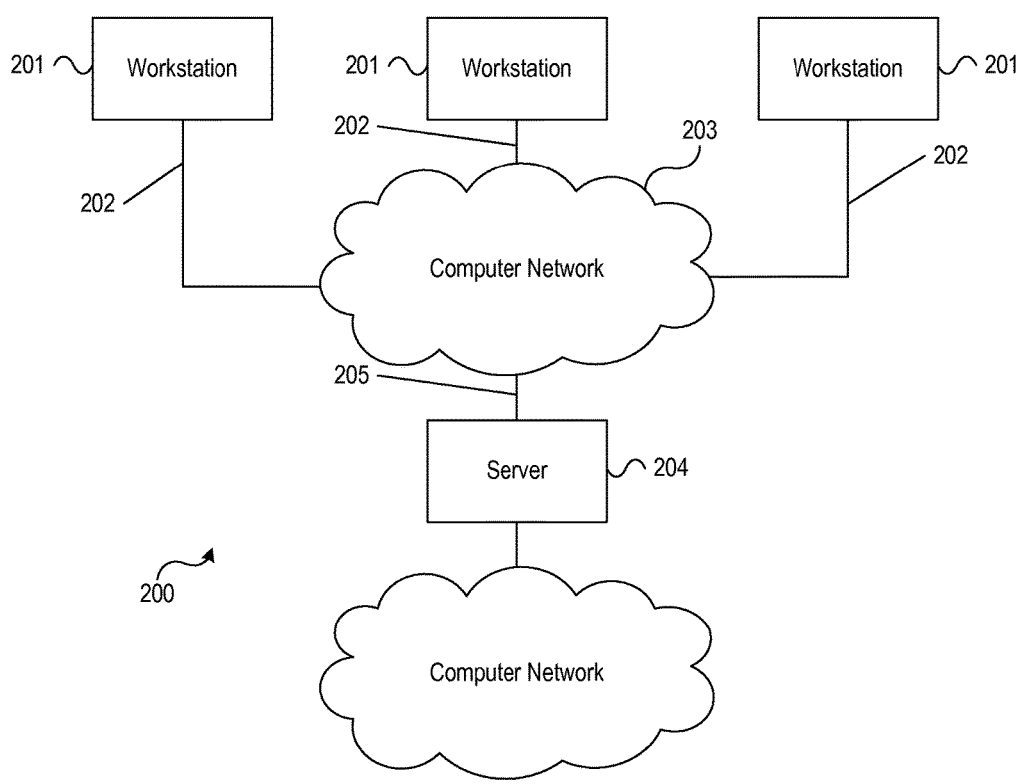
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
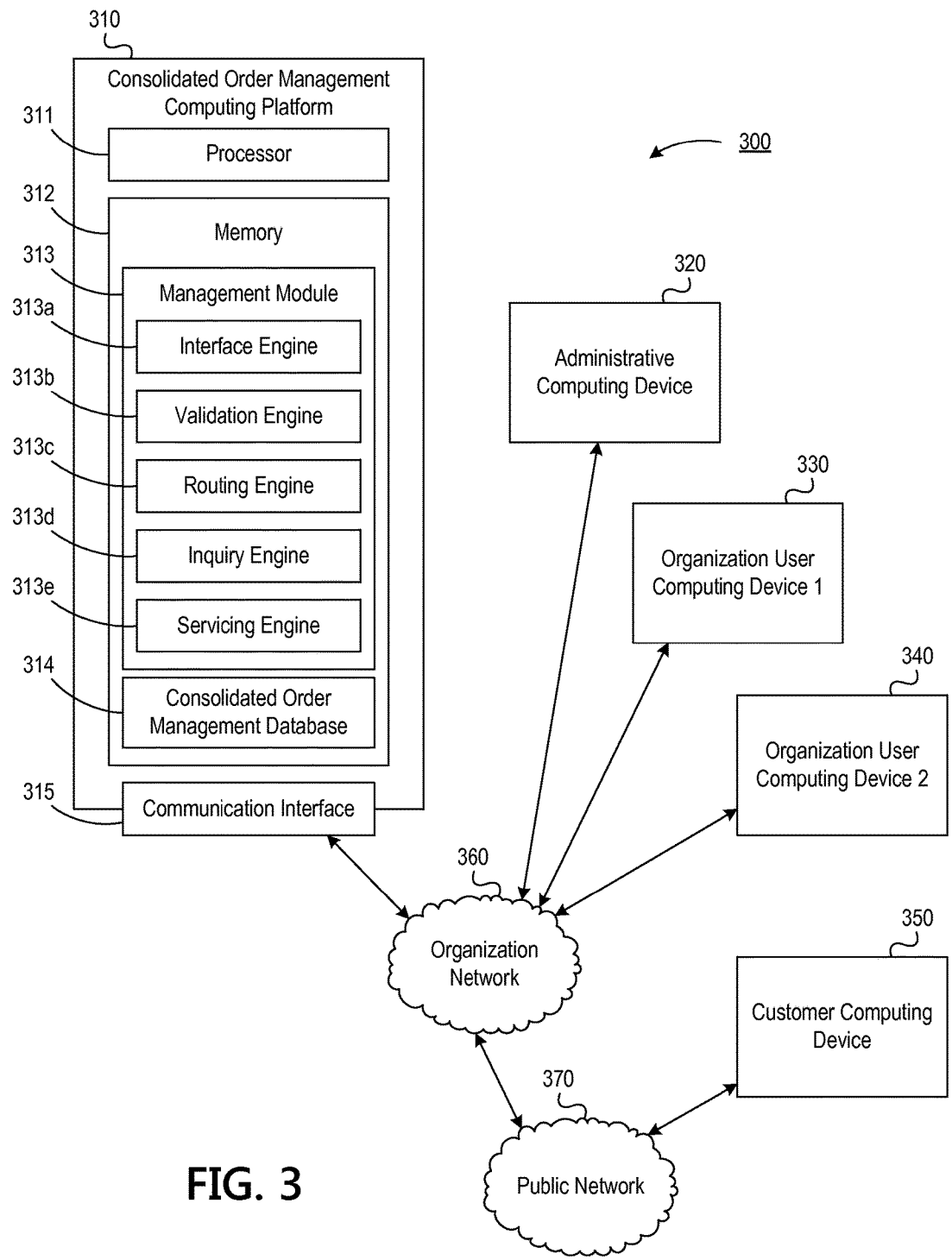
FIG. 3 depicts an illustrative computing environment for providing consolidated order management in accordance with one or more example embodiments.

FIG. 3 depicts an illustrative computing environment for providing consolidated order management in accordance with one or more example embodiments. For example computing environment 300 may include an administrative computing device 320, a first organization user computing device 330, a second organization user computing device 340, and a customer computing device 350. Administrative computing device 320 may, for example, be used by and/or be configured to be used by an administrative user of an organization, such as an administrative user of a financial institution and/or an administrative user of a particular business unit of a financial institution. Organization user computing device 330 may, for example, be used by and/or be configured to be used by a first user of an organization, such as a first employee of the financial institution, and organization user computing device 340 may, for example, be used by and/or be configured to be used by a second user of the organization different from the first user of the organization, such as a second employee of the financial institution different from the first employee of the financial institution. Customer computing device 350 may, for example be used by and/or be configured to be used by a customer of an organization, such as a customer of the financial institution.

In one or more arrangements, administrative computing device 320, organization user computing device 330, organization user computing device 340, and customer computing device 350 may be any type of computing device capable of receiving a user interface, receiving input via the user interface, and communicating the received input to one or more other computing devices. For example, administrative computing device 320, organization user computing device 330, organization user computing device 340, and customer computing device 350 may, in some instances, be and/or include server computers, desktop computers, laptop computers, tablet computers, smart phones, or the like. As noted above, and as illustrated in greater detail below, any and/or all of administrative computing device 320, organization user computing device 330, organization user computing device 340, and customer computing device 350 may, in some instances, be special-purpose computing devices configured to perform specific functions.

Computing environment 300 also may include one or more computing platforms. For example, computing environment 300 may include consolidated order management computing platform 310. Consolidated order management computing platform 310 may include one or more computing devices configured to perform one or more of the functions described herein. For example, consolidated order management computing platform 310 may include one or more computers (e.g., laptop computers, desktop computers, servers, server blades, or the like).

Computing environment 300 also may include one or more networks, which may interconnect one or more of consolidated order management computing platform 310, administrative computing device 320, organization user computing device 330, organization user computing device 340, and customer computing device 350. For example, computing environment 300 may include organization network 360 and public network 370. Organization network 360 and/or public network 370 may include one or more sub-networks (e.g., LANs, WANs, or the like). Organization network 360 may be associated with a particular organization (e.g., a corporation, financial institution, educational institution, governmental institution, or the like) and may interconnect one or more computing devices associated with the organization. For example, consolidated order management computing platform 310, administrative computing device 320, organization user computing device 330, and organization user computing device 340 may be associated with an organization (e.g., a financial institution), and organization network 360 may be associated with and/or operated by the organization, and may include one or more networks (e.g., LANs, WANs, VPNs, or the like) that interconnect consolidated order management computing platform 310, administrative computing device 320, organization user computing device 330, and organization user computing device 340 and one or more other computing devices and/or computer systems that are used by, operated by, and/or otherwise associated with the organization. Public network 370 may connect organization network 360 and/or one or more computing devices connected thereto (e.g., consolidated order management computing platform 310, administrative computing device 320, organization user computing device 330, and organization user computing device 340) with one or more networks and/or computing devices that are not associated with the organization. For example, customer computing device 350 might not be associated with an organization that operates organization network 360 (e.g., because customer computing device 350 may be owned and/or operated by one or more entities different from the organization that operates organization network 360, such as one or more customers of the organization, rather than being owned and/or operated by the organization itself or an employee or affiliate of the organization), and public network 370 may include one or more networks (e.g., the internet) that connect customer computing device 350 to organization network 360 and/or one or more computing devices connected thereto (e.g., consolidated order management computing platform 310, administrative computing device 320, organization user computing device 330, and organization user computing device 340).

Consolidated order management computing platform 310 may include one or more processors 311, memory 312, and communication interface 315. A data bus may interconnect processor(s) 311, memory 312, and communication interface 315. Communication interface 315 may be a network interface configured to support communication between consolidated order management computing platform 310 and organization network 360 and/or one or more sub-networks thereof. Memory 312 may include one or more program modules having instructions that when executed by processor(s) 311 cause consolidated order management computing platform 310 to perform one or more functions described herein and/or one or more databases that may store and/or otherwise maintain information which may be used by such program modules and/or processor(s) 311. For example, memory 312 may include a management module 313, which may include instructions that when executed by processor(s) 311 cause consolidated order management computing platform 310 to perform one or more functions described herein, such as instructions for providing consolidated order management, as illustrated in greater detail below. For instance, management module 313 may include instructions that when executed by processor(s) 311 cause consolidated order management computing platform 310 to provide an interface engine 313*a* (which may, e.g., provide one or more consolidated order interface functions), a validation engine 313*b* (which may, e.g., provide one or more consolidated validation functions), a routing engine 313*c* (which may, e.g., provide one or more consolidated routing functions), an inquiry engine 313*d* (which may, e.g., provide one or more consolidated order inquiry functions), and a servicing engine 313*e* (which may, e.g., provide one or more consolidated servicing inquiry functions). In addition, memory 312 may include a consolidated order management database 314, which may store information that may be used by consolidated order management computing platform 310 for various purposes, as illustrated in greater detail below. For example, consolidated order management database 314 may store, maintain, and/or otherwise include user interface information, such as product-specific and/or channel-specific display layout information and/or interface information, which may be used by consolidated order management computing platform 310. Additionally or alternatively, consolidated order management database 314 may store, maintain, and/or otherwise include: one or more validation rules and/or other validation information; one or more routing rules and/or other routing information; order history information; account history information; warning history and/or error information; and/or other information, any and/or all of which may be used by consolidated order management computing platform 310 and/or by one or more other computing devices in computing environment 300, as illustrated in greater detail below.

Figure 4A:
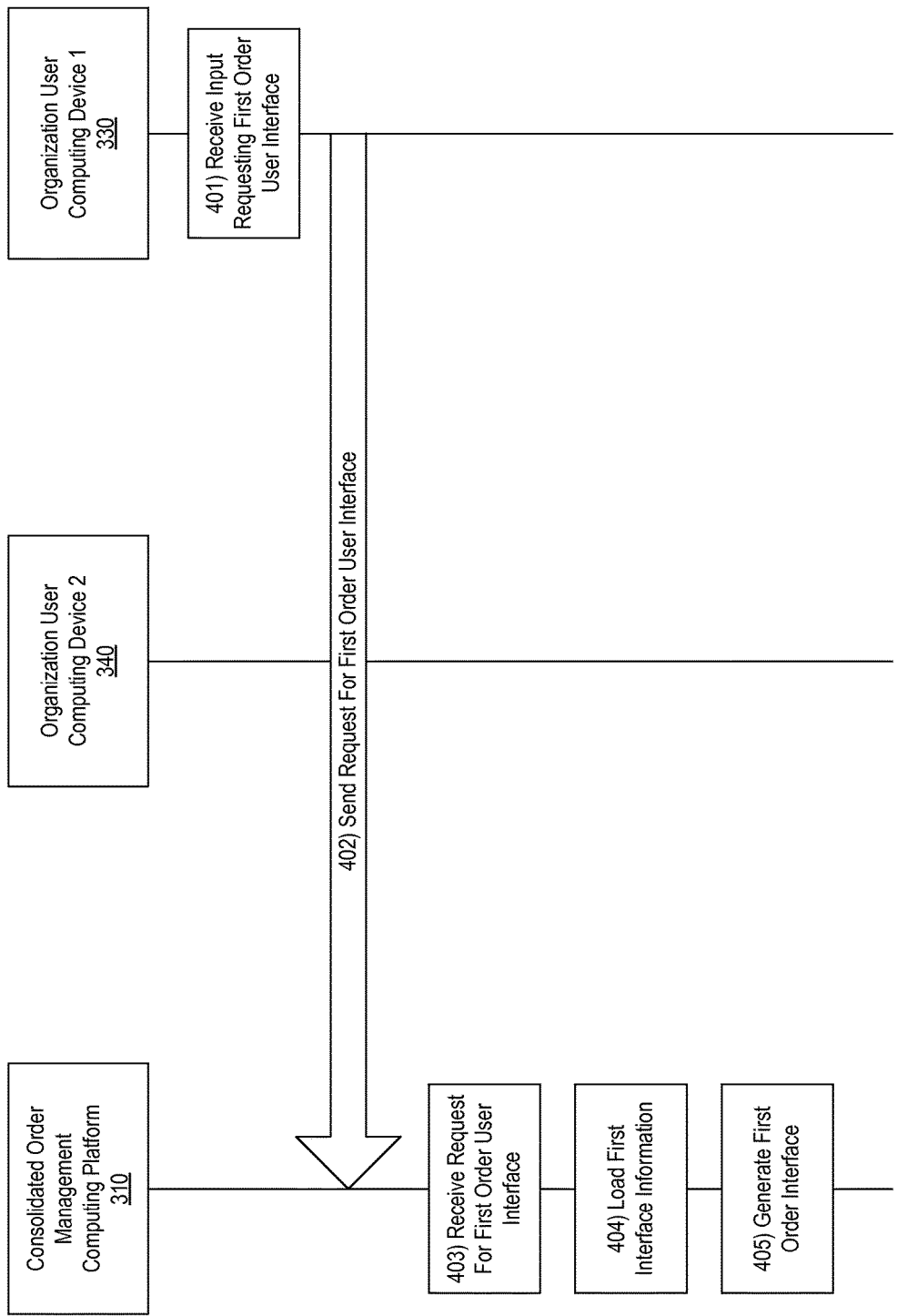
FIGS. 4A-4D depict an illustrative event sequence for providing consolidated order management using consolidated order interfaces in accordance with one or more example embodiments.

FIGS. 4A-4D depict an illustrative event sequence for providing consolidated order management using consolidated order interfaces in accordance with one or more example embodiments. Referring to FIG. 4A, at step 401, organization user computing device 330 may receive input requesting a first order user interface. Such input may, for instance, identify a particular channel, product, and/or set of products for which the user of organization user computing device 330 wishes to create and/or modify order information and may request one or more user interfaces to create and/or modify such order information. At step 402, organization user computing device 330 may send a request for a first order user interface to consolidated order management computing platform 310.

At step 403, consolidated order management computing platform 310 may receive the request for the first order user interface from organization user computing device 330. For example, at step 403, consolidated order management computing platform 310 may receive, via the communication interface (e.g., communication interface 315), and from a first organization user computing device (e.g., organization user computing device 330), a first request for a first order user interface.

In some embodiments, the request for the first order user interface may include first channel information identifying a first channel associated with a first order being created on the first organization user computing device. For example, the request for the first order user interface received by consolidated order management computing platform 310 from organization user computing device 330 at step 403 may include first channel information identifying a first channel associated with a first order being created on organization user computing device 330. The first channel information may, for instance, identify that the first order being created on the first organization user computing device (e.g., organization user computing device 330) is being created in and/or is otherwise associated with a retail brokerage channel, a managed product channel, an online channel, a retirement channel, and/or one or more other channels that may be established by and/or otherwise associated with an organization, such as a financial institution, which may own, operate, maintain, and/or use consolidated order management computing platform 310, for example.

In some embodiments, the request for the first order user interface comprises first product information identifying a first product associated with the first order being created on the first organization user computing device. For example, the request for the first order user interface received by consolidated order management computing platform 310 from organization user computing device 330 at step 403 may include first product information identifying a first product associated with the first order being created on organization user computing device 330. The first product information may, for instance, identify that the first order being created on the first organization user computing device (e.g., organization user computing device 330) involves trading in and/or is otherwise associated with one or more equity products, one or more fixed income products, one or more mutual fund products, one or more options products, and/or one or more other products that may be offered by and/or otherwise associated with an organization, such as a financial institution, which may own, operate, maintain, and/or use consolidated order management computing platform 310, for example.

At step 404, consolidated order management computing platform 310 may load first interface information. For example, based on receiving the first request for the first order user interface from the first organization user computing device (e.g., organization user computing device 330), consolidated order management computing platform 310 may, at step 404, load first interface information from a consolidated order management database (e.g., consolidated order management database 314). The first interface information loaded from consolidated order management database 314 by consolidated order management computing platform 310 may, for instance, define one or more user interface layouts, options, features, templates, and/or the like for the particular channel and/or product associated with the first order being created on organization user computing device 330.

At step 405, consolidated order management computing platform 310 may generate a first order interface. For example, at step 405, consolidated order management computing platform 310 may generate a first order interface based on the first interface information loaded from the consolidated order management database (e.g., consolidated order management database 314). In generating the first order interface based on the first interface information loaded from the consolidated order management database (e.g., consolidated order management database 314), consolidated order management computing platform 310 may, for instance, create, compile, and/or otherwise form one or more graphical user interfaces and/or other user interfaces associated with the first order interface based on the first interface information loaded from the consolidated order management database (e.g., consolidated order management database 314).

Figure 4B:
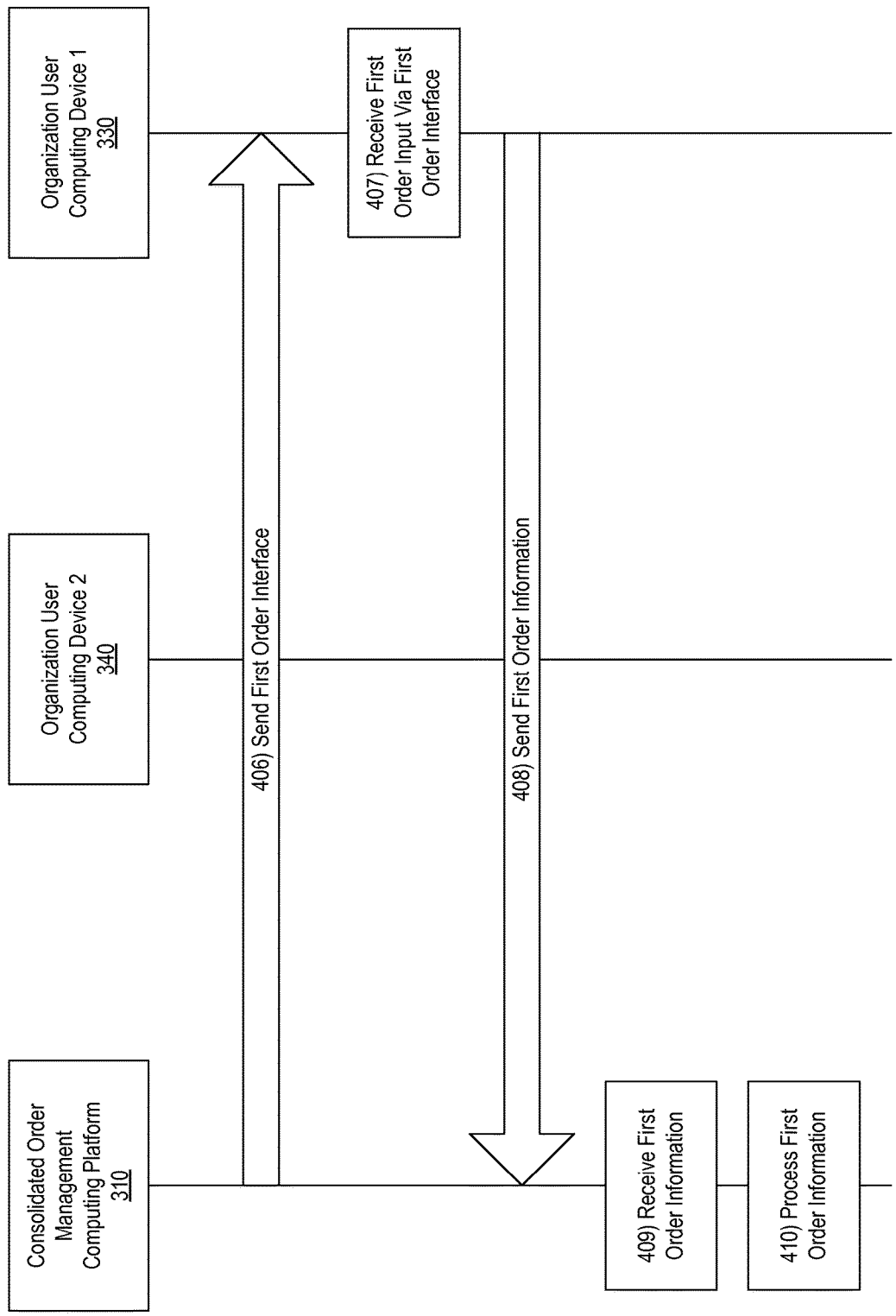

Referring to FIG. 4B, at step 406, consolidated order management computing platform 310 may send the first order interface to organization user computing device 330. For example, at step 406, consolidated order management computing platform 310 may send, via the communication interface (e.g., communication interface 315), and to the first organization user computing device (e.g., organization user computing device 330), the first order interface generated based on the first interface information loaded from the consolidated order management database (e.g., consolidated order management database 314).

At step 407, organization user computing device 330 may receive first order input via the first order interface. At step 408, organization user computing device 330 may send first order information to consolidated order management computing platform 310 (e.g., based on the first order input received by organization user computing device 330 via the first order interface).

At step 409, consolidated order management computing platform 310 may receive the first order information from organization user computing device 330. For example, at step 409, consolidated order management computing platform 310 may receive, via the communication interface (e.g., communication interface 315), and from the first organization user computing device (e.g., organization user computing device 330), first order information. The first order information may, for instance, be associated with the first order being created on the first organization user computing device (e.g., organization user computing device 330), and the first order information may be received by the first organization user computing device (e.g., organization user computing device 330) via the first order interface generated based on the first interface information loaded from the consolidated order management database (e.g., consolidated order management database 314).

At step 410, consolidated order management computing platform 310 may process the first order information. For example, at step 410, consolidated order management computing platform 310 may process the first order information received from the first organization user computing device (e.g., organization user computing device 330).

In some embodiments, processing the first order information received from the first organization user computing device may include validating the first order information received from the first organization user computing device based on a first set of one or more validation rules loaded from the consolidated order management database. For example, in processing the first order information received from the first organization user computing device (e.g., organization user computing device 330), consolidated order management computing platform 310 may validate the first order information received from the first organization user computing device (e.g., organization user computing device 330) based on a first set of one or more validation rules loaded from the consolidated order management database (e.g., consolidated order management database 314), as illustrated in greater detail below.

In some embodiments, processing the first order information received from the first organization user computing device may include routing the first order information received from the first organization user computing device based on a first set of one or more routing rules loaded from the consolidated order management database. For example, in processing the first order information received from the first organization user computing device (e.g., organization user computing device 330), consolidated order management computing platform 310 may route the first order information received from the first organization user computing device (e.g., organization user computing device 330), as illustrated in greater detail below.

Figure 4C:
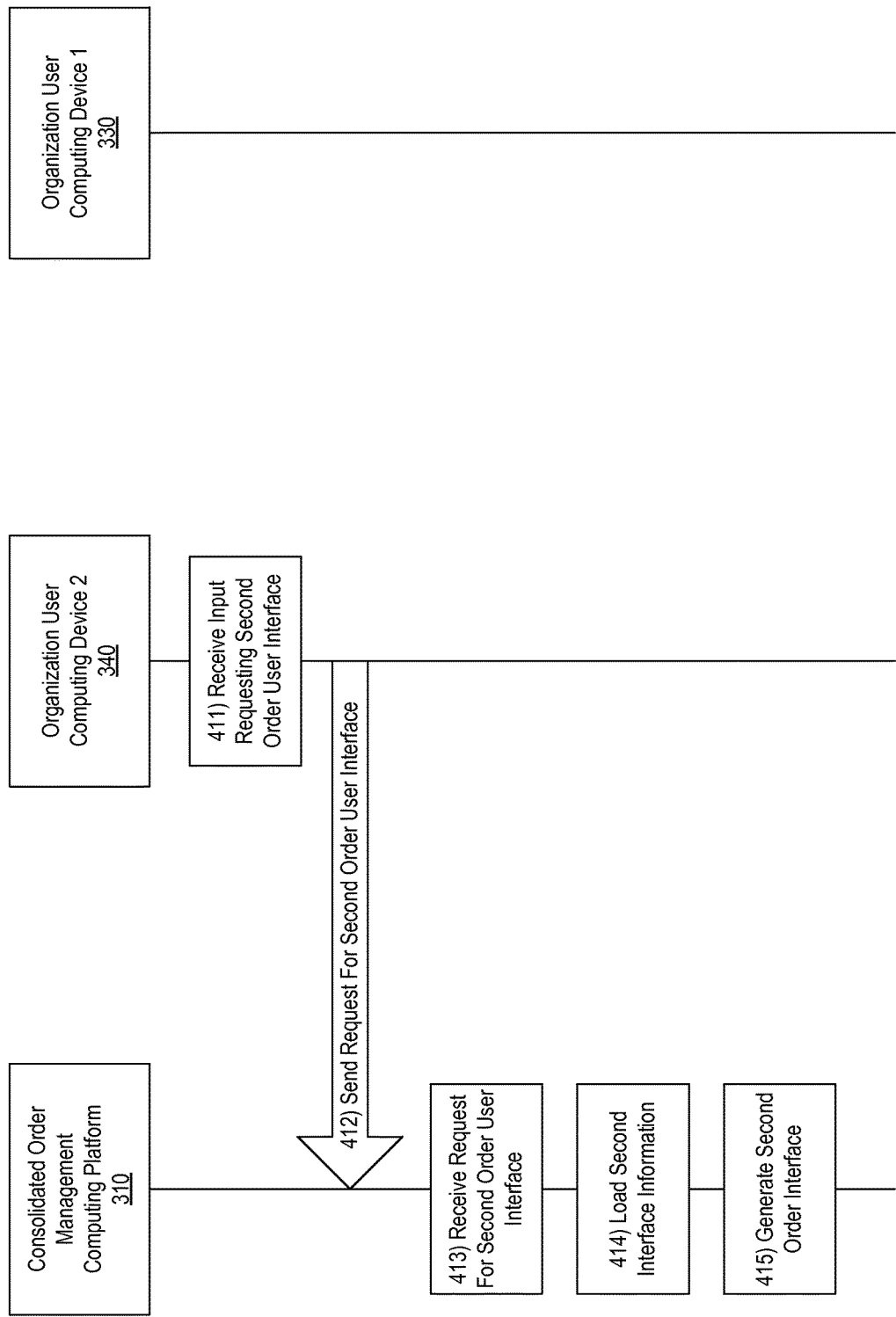

Referring to FIG. 4C, at step 411, organization user computing device 340 may receive input requesting a second order interface. At step 412, organization user computing device 340 may send a request for a second order user interface to consolidated order management computing platform 310.

At step 413, consolidated order management computing platform 310 may receive the request for the second order user interface from organization user computing device 340. For example, at step 413, consolidated order management computing platform 310 may receive, via the communication interface (e.g., communication interface 315), and from a second organization user computing device (e.g., organization user computing device 340), a second request for a second order user interface.

In some embodiments, the request for the second order user interface may include second channel information identifying a second channel associated with a second order being created on the second organization user computing device, the second channel associated with the second order being created on the second organization user computing device being different from the first channel associated with the first order being created on the first organization user computing device. For example, the request for the second order user interface (which may, e.g., be received by consolidated order management computing platform 310 at step 413) may include second channel information identifying a second channel associated with a second order being created on the second organization user computing device (e.g., organization user computing device 340), and the second channel associated with the second order being created on the second organization user computing device (e.g., organization user computing device 340) may be different from the first channel associated with the first order being created on the first organization user computing device (e.g., organization user computing device 330).

In some embodiments, the request for the second order user interface may include second product information identifying a second product associated with the second order being created on the second organization user computing device, the second product associated with the second order being created on the second organization user computing device being different from the first product associated with the first order being created on the first organization user computing device. For example, the request for the second order user interface (which may, e.g., be received by consolidated order management computing platform 310 at step 413) may include second product information identifying a second product associated with the second order being created on the second organization user computing device (e.g., organization user computing device 340), and the second product associated with the second order being created on the second organization user computing device (e.g., organization user computing device 340) may be different from the first product associated with the first order being created on the first organization user computing device (e.g., organization user computing device 330).

At step 414, consolidated order management computing platform 310 may load second interface information. For example, based on receiving the second request for the second order user interface from the second organization user computing device (e.g., organization user computing device 340), consolidated order management computing platform 310 may, at step 414, load second interface information from the consolidated order management database (e.g., consolidated order management database 314), and the second interface information may be different from the first interface information.

At step 415, consolidated order management computing platform 310 may generate a second order interface. For example, at step 415, consolidated order management computing platform 310 may generate a second order interface based on the second interface information loaded from the consolidated order management database (e.g., consolidated order management database 314), and the second order interface may be different from the first order interface.

Figure 4D:
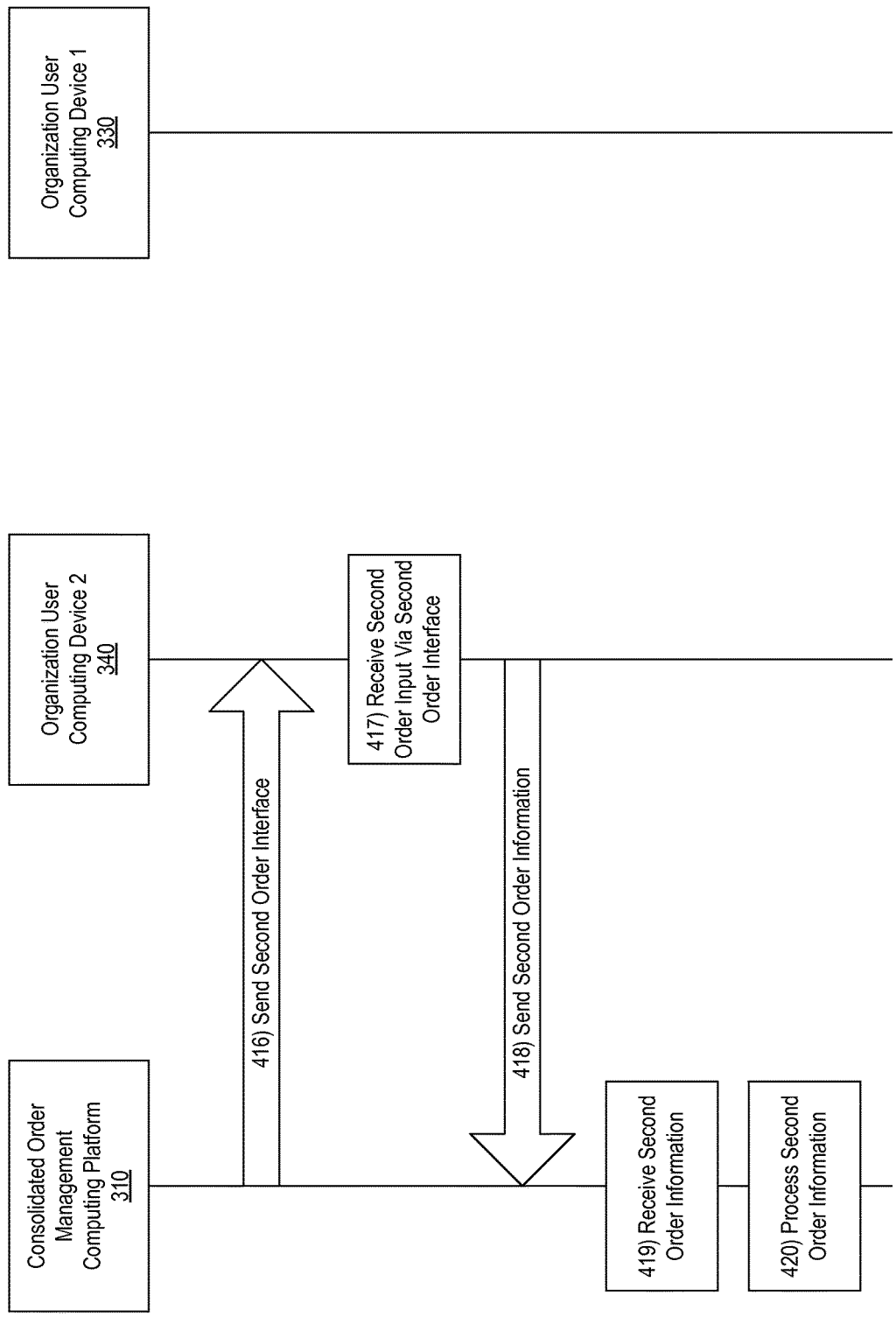

Referring to FIG. 4D, at step 416, consolidated order management computing platform 310 may send the second order interface to organization user computing device 340. For example, at step 416, consolidated order management computing platform 310 may send, via the communication interface (e.g., communication interface 315), and to the second organization user computing device (e.g., organization user computing device 340), the second order interface generated based on the second interface information loaded from the consolidated order management database (e.g., consolidated order management database 314).

At step 417, organization user computing device 340 may receive second order input via the second order interface. At step 418, organization user computing device 340 may send second order information to consolidated order management computing platform 310.

At step 419, consolidated order management computing platform 310 may receive the second order information from organization user computing device 340. For example, at step 419, consolidated order management computing platform 310 may receive, via the communication interface (e.g., communication interface 315), and from the second organization user computing device (e.g., organization user computing device 340), second order information. The second order information may, for instance, be associated with the second order being created on the second organization user computing device (e.g., organization user computing device 340), and the second order information may be received by the second organization user computing device (e.g., organization user computing device 340) via the second order interface generated based on the second interface information loaded from the consolidated order management database (e.g., consolidated order management database 314).

At step 420, consolidated order management computing platform 310 may process the second order information. For example, at step 420, consolidated order management computing platform 310 may process the second order information received from the second organization user computing device (e.g., organization user computing device 340).

In some embodiments, processing the second order information received from the second organization user computing device may include validating the second order information received from the second organization user computing device based on a second set of one or more validation rules loaded from the consolidated order management database, the second set of one or more validation rules loaded from the consolidated order management database being different from the first set of one or more validation rules loaded from the consolidated order management database. For example, in processing the second order information received from the second organization user computing device (e.g., organization user computing device 340), consolidated order management computing platform 310 may validate the second order information received from the second organization user computing device (e.g., organization user computing device 340) based on a second set of one or more validation rules loaded from the consolidated order management database (e.g., consolidated order management database 314), and the second set of one or more validation rules loaded from the consolidated order management database (e.g., consolidated order management database 314) may be different from the first set of one or more validation rules loaded from the consolidated order management database (e.g., consolidated order management database 314).

In some embodiments, processing the second order information received from the second organization user computing device may include routing the second order information received from the second organization user computing device based on a second set of one or more routing rules loaded from the consolidated order management database, the second set of one or more routing rules loaded from the consolidated order management database being different from the first set of one or more routing rules loaded from the consolidated order management database. For example, in processing the second order information received from the second organization user computing device (e.g., organization user computing device 340), consolidated order management computing platform 310 may route the second order information received from the second organization user computing device (e.g., organization user computing device 340) based on a second set of one or more routing rules loaded from the consolidated order management database (e.g., consolidated order management database 314), and the second set of one or more routing rules loaded from the consolidated order management database (e.g., consolidated order management database 314) may be different from the first set of one or more routing rules loaded from the consolidated order management database (e.g., consolidated order management database 314).

Figure 5B:
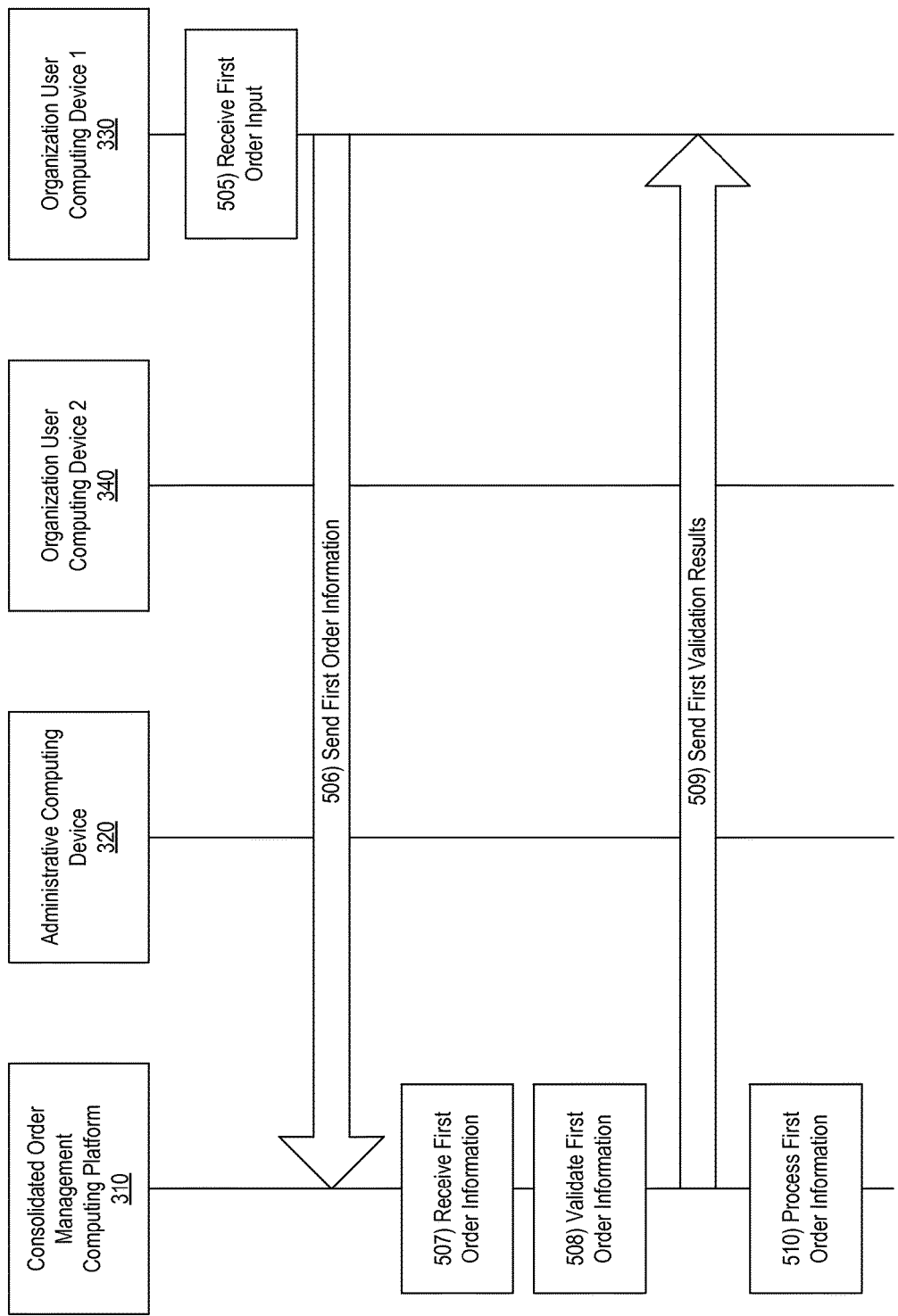

FIGS. 5A-5D depict an illustrative event sequence for providing consolidated order management using consolidated validation rules in accordance with one or more example embodiments. Referring to FIG. 5A, at step 501, administrative computing device 320 may receive input defining a first set of validation rules. At step 502, administrative computing device 320 may send the first set of validation rules to consolidated order management computing platform 310.

At step 503, consolidated order management computing platform 310 may receive the first set of validation rules from administrative computing device 320. For example, at step 503, consolidated order management computing platform 310 may receive, via the communication interface (e.g., communication interface 315), and from an administrative computing device associated with an organization (e.g., administrative computing device 320), a first set of one or more validation rules. At step 504, consolidated order management computing platform 310 may store the first set of validation rules. For example, based on receiving the first set of one or more validation rules from the administrative computing device associated with the organization (e.g., administrative computing device 320), consolidated order management computing platform 310 may store the first set of one or more validation rules received from the administrative computing device associated with the organization (e.g., administrative computing device 320) in a consolidated order management database (e.g., consolidated order management database 314).

Referring to FIG. 5B, at step 505, organization user computing device 330 may receive first order input. At step 506, organization user computing device 330 may send first order information to consolidated order management computing platform 310.

At step 507, consolidated order management computing platform 310 may receive the first order information from organization user computing device 330. For example, at step 507, consolidated order management computing platform 310 may receive, via the communication interface (e.g., communication interface 315), and from a first organization user computing device (e.g., organization user computing device 330), first order information associated with a first order created on the first organization user computing device (e.g., organization user computing device 330). At step 508, consolidated order management computing platform 310 may validate the first order information. For example, at step 508, consolidated order management computing platform 310 may validate the first order information received from the first organization user computing device (e.g., organization user computing device 330) based on the first set of one or more validation rules stored in the consolidated order management database (e.g., consolidated order management database 314).

In some embodiments, the first set of one or more validation rules stored in the consolidated order management database may include one or more channel rules for a first channel associated with the first order created on the first organization user computing device. For example, the first set of one or more validation rules stored in the consolidated order management database (e.g., consolidated order management database 314) may include one or more channel rules for a first channel associated with the first order created on the first organization user computing device (e.g., organization user computing device 330).

In some embodiments, the first set of one or more validation rules stored in the consolidated order management database may include one or more product rules for a first product associated with the first order created on the first organization user computing device. For example, the first set of one or more validation rules stored in the consolidated order management database (e.g., consolidated order management database 314) may include one or more product rules for a first product associated with the first order created on the first organization user computing device (e.g., organization user computing device 330).

In some embodiments, the first set of one or more validation rules stored in the consolidated order management database may include one or more program rules for a first program associated with the first order created on the first organization user computing device. For example, the first set of one or more validation rules stored in the consolidated order management database (e.g., consolidated order management database 314) may include one or more program rules for a first program associated with the first order created on the first organization user computing device (e.g., organization user computing device 330).

In some embodiments, the first set of one or more validation rules stored in the consolidated order management database may include one or more account rules for a first account associated with the first order created on the first organization user computing device. For example, the first set of one or more validation rules stored in the consolidated order management database (e.g., consolidated order management database 314) may include one or more account rules for a first account associated with the first order created on the first organization user computing device (e.g., organization user computing device 330).

In some embodiments, validating the first order information received from the first organization user computing device based on the first set of one or more validation rules stored in the consolidated order management database may include selecting the first set of one or more validation rules stored in the consolidated order management database for validating the first order information received from the first organization user computing device. For example, in validating the first order information received from the first organization user computing device (e.g., organization user computing device 330) based on the first set of one or more validation rules stored in the consolidated order management database (e.g., consolidated order management database 314), consolidated order management computing platform 310 may select the first set of one or more validation rules stored in the consolidated order management database (e.g., consolidated order management database 314) for validating the first order information received from the first organization user computing device (e.g., organization user computing device 330). For instance, the first set of validation rules may be selected by consolidated order management computing platform 310 for use in validating the first order information based on the one or more channels, products, programs, accounts, or the like associated with the first order.

At step 509, consolidated order management computing platform 310 may send first validation results information to organization user computing device 330. For example, based on validating the first order information received from the first organization user computing device (e.g., organization user computing device 330) based on the first set of one or more validation rules stored in the consolidated order management database (e.g., consolidated order management database 314), consolidated order management computing platform 310 may send, via the communication interface (e.g., communication interface 315), to the first organization user computing device (e.g., organization user computing device 330), first validation results information. In some instances, the first validation results information may include information indicating that the first order created on the first organization user computing device is invalid based on the first set of one or more validation rules stored in the consolidated order management database. For instance, the first validation results information (which may, e.g., be sent by consolidated order management computing platform 310 to organization user computing device 330 at step 509) may include information indicating that the first order created on the first organization user computing device (e.g., organization user computing device 330) is invalid based on the first set of one or more validation rules stored in the consolidated order management database (e.g., consolidated order management database 314). In some instances, the first validation results information may include information indicating that the first order created on the first organization user computing device is valid based on the first set of one or more validation rules stored in the consolidated order management database. For instance, the first validation results information (which may, e.g., be sent by consolidated order management computing platform 310 to organization user computing device 330 at step 509) may include information indicating that the first order created on the first organization user computing device (e.g., organization user computing device 330) is valid based on the first set of one or more validation rules stored in the consolidated order management database (e.g., consolidated order management database 314).

At step 510, consolidated order management computing platform 310 may process the first order information. For example, at step 410, consolidated order management computing platform 310 may process the first order information received from the first organization user computing device (e.g., organization user computing device 330) based on the first validation results information.

In some embodiments, processing the first order information received from the first organization user computing device based on the first validation results information may include routing the first order information received from the first organization user computing device based on a first set of one or more routing rules loaded from the consolidated order management database. For example, in processing the first order information received from the first organization user computing device (e.g., organization user computing device 330) based on the first validation results information, consolidated order management computing platform 310 may route the first order information received from the first organization user computing device (e.g., organization user computing device 330) based on a first set of one or more routing rules loaded from the consolidated order management database (e.g., consolidated order management database 314). For instance, consolidated order management computing platform 310 may route the first order information to an execution entity, as illustrated in greater detail below.

Figure 5C:
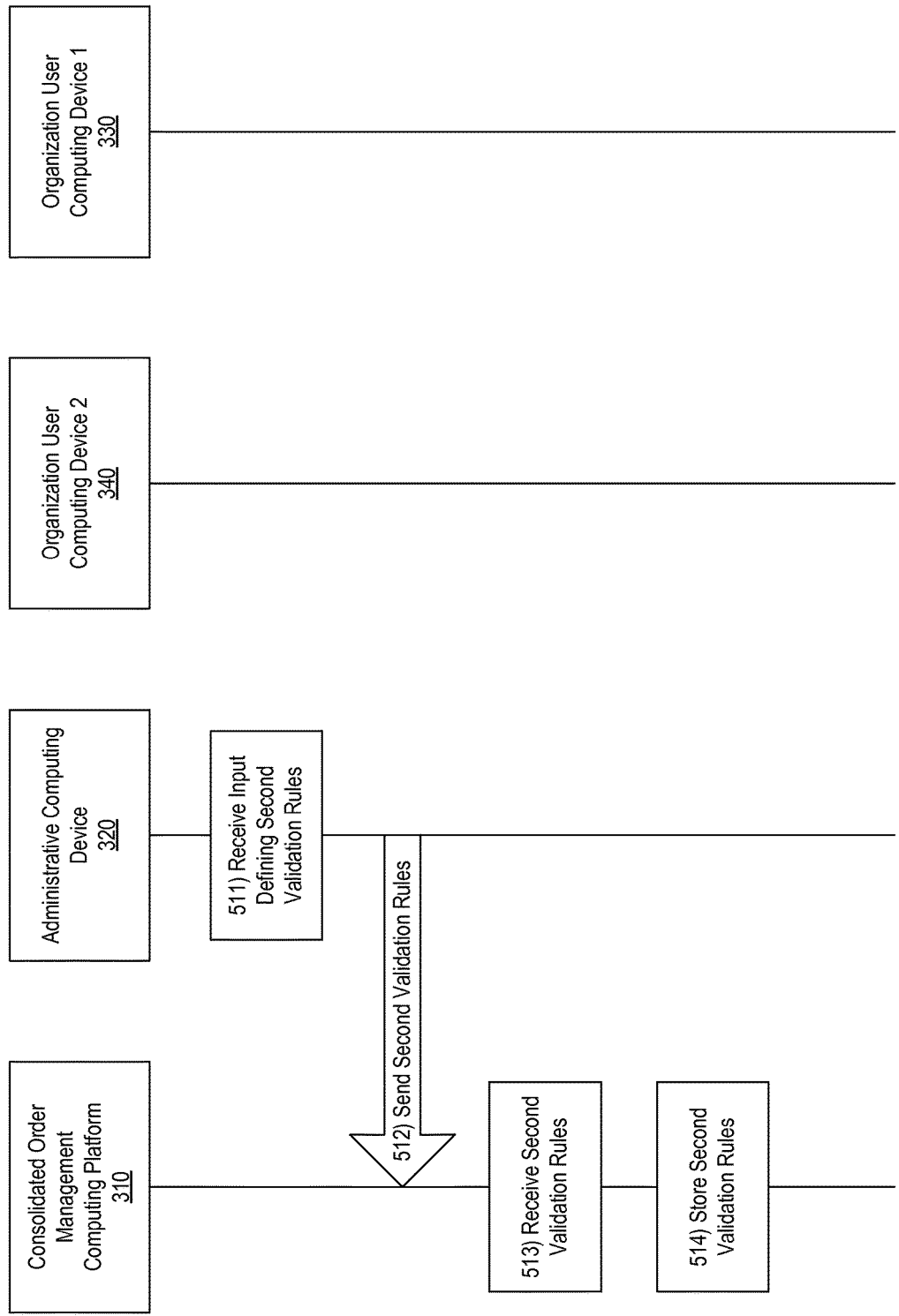

Referring to FIG. 5C, at step 511, administrative computing device 320 may receive input defining a second set of validation rules. At step 512, administrative computing device 320 may send the second set of validation rules to consolidated order management computing platform 310.

At step 513, consolidated order management computing platform 310 may receive the second set of validation rules from administrative computing device 320. For example, at step 513, consolidated order management computing platform 310 may receive, via the communication interface (e.g., communication interface 315), and from the administrative computing device associated with the organization (e.g., administrative computing device 320), a second set of one or more validation rules. At step 514, consolidated order management computing platform 310 may store the second set of validation rules. For example, based on receiving the second set of one or more validation rules from the administrative computing device associated with the organization (e.g., administrative computing device 320), consolidated order management computing platform 310 may store the second set of one or more validation rules received from the administrative computing device associated with the organization (e.g., administrative computing device 320) in the consolidated order management database (consolidated order management database 314).

Figure 5D:
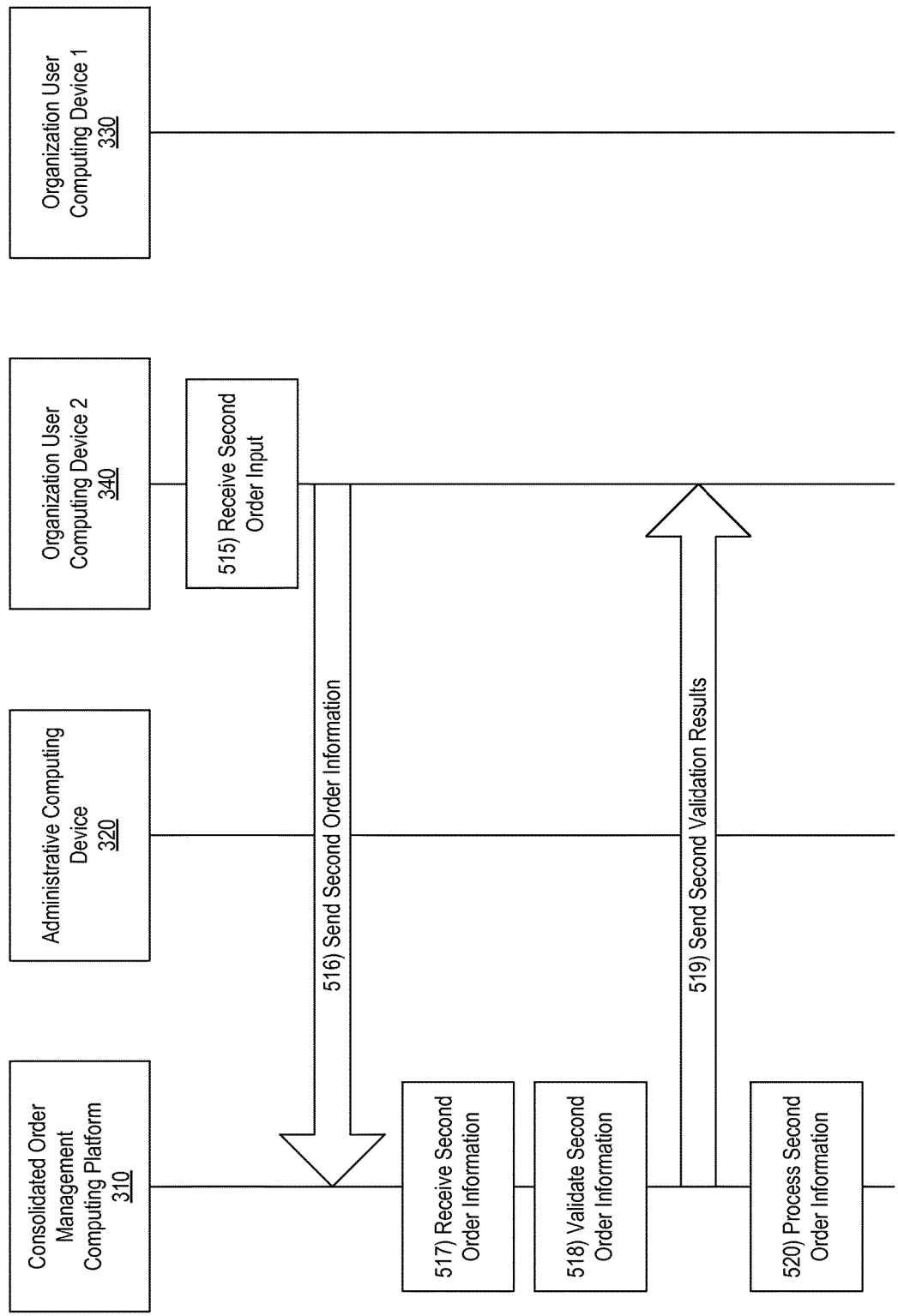

Referring to FIG. 5D, at step 515, organization user computing device 340 may receive second order input. At step 516, organization user computing device 340 may send second order information to consolidated order management computing platform 310.

At step 517, consolidated order management computing platform 310 may receive the second order information from organization user computing device 340. For example, at step 517, consolidated order management computing platform 310 may receive, via the communication interface (e.g., communication interface 315), and from a second organization user computing device (e.g., organization user computing device 340), second order information associated with a second order created on the second organization user computing device (e.g., organization user computing device 340). At step 518, consolidated order management computing platform 310 may validate the second order information. For example, at step 518, consolidated order management computing platform 310 may validate the second order information received from the second organization user computing device (e.g., organization user computing device 340) based on the second set of one or more validation rules stored in the consolidated order management database (e.g., consolidated order management database 314).

In some embodiments, validating the second order information received from the second organization user computing device based on the second set of one or more validation rules stored in the consolidated order management database may include selecting the second set of one or more validation rules stored in the consolidated order management database for validating the second order information received from the second organization user computing device. For example, in validating the second order information received from the second organization user computing device (e.g., organization user computing device 340) based on the second set of one or more validation rules stored in the consolidated order management database (e.g., consolidated order management database 314), consolidated order management computing platform 310 may select the second set of one or more validation rules stored in the consolidated order management database (e.g., consolidated order management database 314) for validating the second order information received from the second organization user computing device (e.g., organization user computing device 340). For instance, the second set of validation rules may be selected by consolidated order management computing platform 310 for use in validating the second order information based on the one or more channels, products, programs, accounts, or the like associated with the second order.

At step 519, consolidated order management computing platform 310 may send second validation results information to organization user computing device 340. For example, based on validating the second order information received from the second organization user computing device (e.g., organization user computing device 340) based on the second set of one or more validation rules stored in the consolidated order management database (e.g., consolidated order management database 314), consolidated order management computing platform 310 may send, via the communication interface (e.g., communication interface 315), to the second organization user computing device (e.g., organization user computing device 340), second validation results information. In some instances, the second validation results information may include information indicating that the second order created on the second organization user computing device is invalid based on the second set of one or more validation rules stored in the consolidated order management database. For instance, the second validation results information (which may, e.g., be sent by consolidated order management computing platform 310 to organization user computing device 340 at step 519) may include information indicating that the second order created on the second organization user computing device (e.g., organization user computing device 340) is invalid based on the second set of one or more validation rules stored in the consolidated order management database (e.g., consolidated order management database 314). In some instances, the second validation results information may include information indicating that the second order created on the second organization user computing device is valid based on the second set of one or more validation rules stored in the consolidated order management database. For instance, the second validation results information (which may, e.g., be sent by consolidated order management computing platform 310 to organization user computing device 340 at step 519) may include information indicating that the second order created on the second organization user computing device (e.g., organization user computing device 340) is valid based on the second set of one or more validation rules stored in the consolidated order management database (e.g., consolidated order management database 314).

At step 520, consolidated order management computing platform 310 may process the second order information. For example, at step 520, consolidated order management computing platform 310 may process the second order information received from the second organization user computing device (e.g., organization user computing device 340) based on the second validation results information.

In some embodiments, processing the second order information received from the second organization user computing device based on the second validation results information may include routing the second order information received from the second organization user computing device based on a second set of one or more routing rules loaded from the consolidated order management database. For example, in processing the second order information received from the second organization user computing device (e.g., organization user computing device 340) based on the second validation results information, consolidated order management computing platform 310 may route the second order information received from the second organization user computing device (e.g., organization user computing device 340) based on a second set of one or more routing rules loaded from the consolidated order management database (e.g., consolidated order management database 314). For instance, consolidated order management computing platform 310 may route the second order information to an execution entity, as illustrated in greater detail below.

Figure 6A:
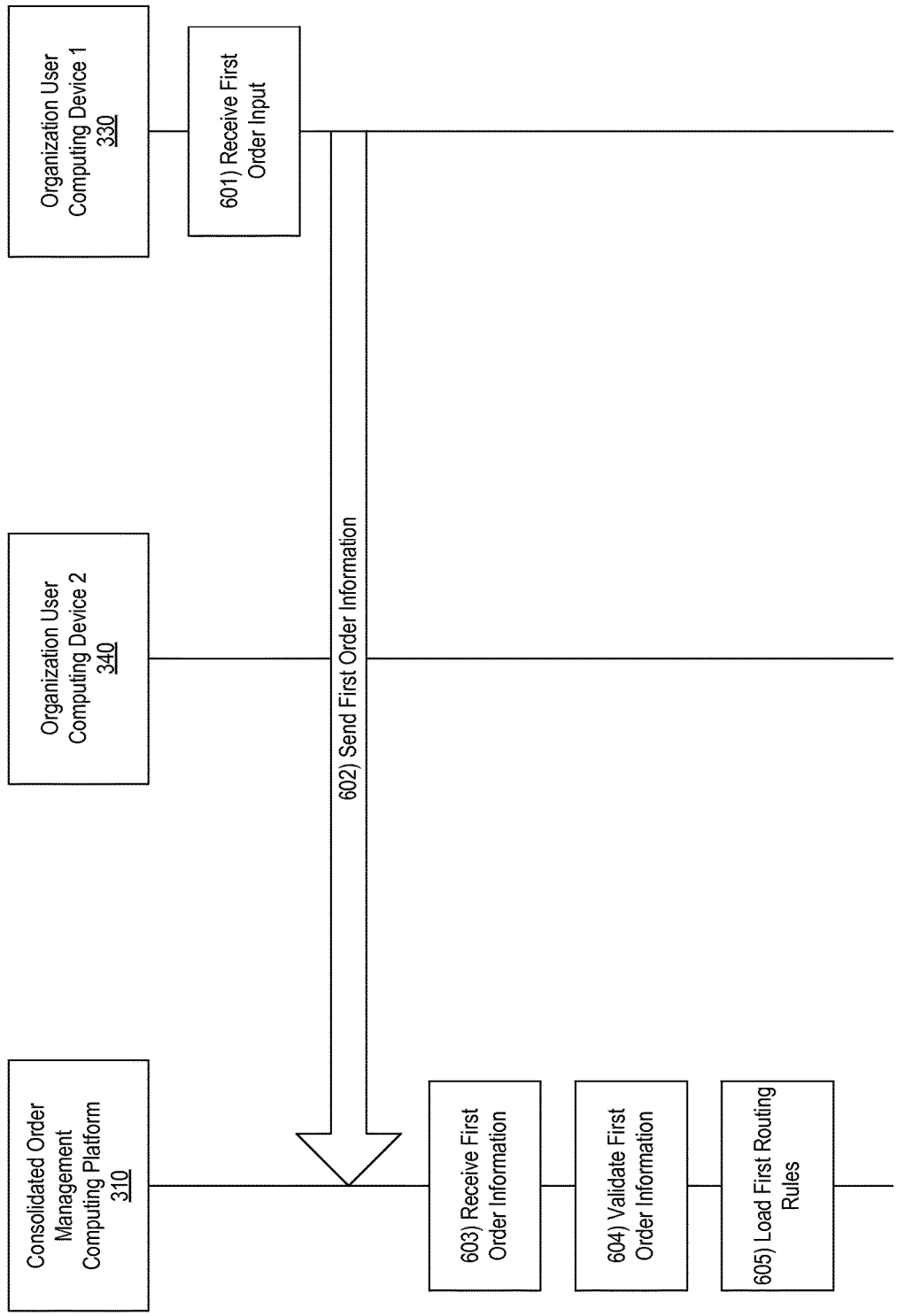
FIGS. 6A-6D depict an illustrative event sequence for providing consolidated order management using consolidated routing rules in accordance with one or more example embodiments.

FIGS. 6A-6D depict an illustrative event sequence for providing consolidated order management using consolidated routing rules in accordance with one or more example embodiments. Referring to FIG. 6A, at step 601, organization user computing device 330 may receive first order input. At step 602, organization user computing device 330 may send first order information to consolidated order management computing platform 310.

At step 603, consolidated order management computing platform 310 may receive the first order information from organization user computing device 330. For example, at step 603, consolidated order management computing platform 310 may receive, via the communication interface (e.g., communication interface 315), and from a first organization user computing device (e.g., organization user computing device 330), first order information associated with a first order created on the first organization user computing device (e.g., organization user computing device 330).

At step 604, consolidated order management computing platform 310 may validate the first order information. For example, at step 604, consolidated order management computing platform 310 may validate the first order information associated with the first order created on the first organization user computing device (e.g., organization user computing device 330) and received from the first organization user computing device (e.g., organization user computing device 330). For instance, consolidated order management computing platform 310 may validate the first order information using one or more validation rules loaded from consolidated order management database 314, as discussed above.

At step 605, consolidated order management computing platform 310 may load a first set of routing rules. For example, based on validating the first order information associated with the first order created on the first organization user computing device (e.g., organization user computing device 330) and received from the first organization user computing device (e.g., organization user computing device 330), consolidated order management computing platform 310 may, at step 605, load a first set of one or more routing rules from a consolidated order management database (e.g., consolidated order management database 314).

In some embodiments, loading the first set of one or more routing rules from the consolidated order management database may include selecting the first set of one or more routing rules from the consolidated order management database for use in routing the first order information associated with the first order created on the first organization user computing device and received from the first organization user computing device. For example, in loading the first set of one or more routing rules from the consolidated order management database (e.g., consolidated order management database 314), consolidated order management computing platform 310 may select the first set of one or more routing rules from the consolidated order management database (e.g., consolidated order management database 314) for use in routing the first order information associated with the first order created on the first organization user computing device (e.g., organization user computing device 330) and received from the first organization user computing device (e.g., organization user computing device 330). For instance, the first set of routing rules may be selected by consolidated order management computing platform 310 for use in routing the first order information based on the one or more channels, products, programs, accounts, or the like associated with the first order.

In some embodiments, the first set of one or more routing rules may be selected from the consolidated order management database for use in routing the first order information associated with the first order created on the first organization user computing device and received from the first organization user computing device based on first channel information identifying a first channel associated with the first order created on the first organization user computing device and received from the first organization user computing device. For example, the first set of one or more routing rules may be selected by consolidated order management computing platform 310 from the consolidated order management database (e.g., consolidated order management database 314) for use in routing the first order information associated with the first order created on the first organization user computing device (e.g., organization user computing device 330) and received from the first organization user computing device (e.g., organization user computing device 330) based on first channel information identifying a first channel associated with the first order created on the first organization user computing device (e.g., organization user computing device 330) and received from the first organization user computing device (e.g., organization user computing device 330).

In some embodiments, the first set of one or more routing rules may be selected from the consolidated order management database for use in routing the first order information associated with the first order created on the first organization user computing device and received from the first organization user computing device based on first product information identifying a first product associated with the first order created on the first organization user computing device and received from the first organization user computing device. For example, the first set of one or more routing rules may be selected by consolidated order management computing platform 310 from the consolidated order management database (e.g., consolidated order management database 314) for use in routing the first order information associated with the first order created on the first organization user computing device (e.g., organization user computing device 330) and received from the first organization user computing device (e.g., organization user computing device 330) based on first product information identifying a first product associated with the first order created on the first organization user computing device (e.g., organization user computing device 330) and received from the first organization user computing device (e.g., organization user computing device 330).

Figure 6B:
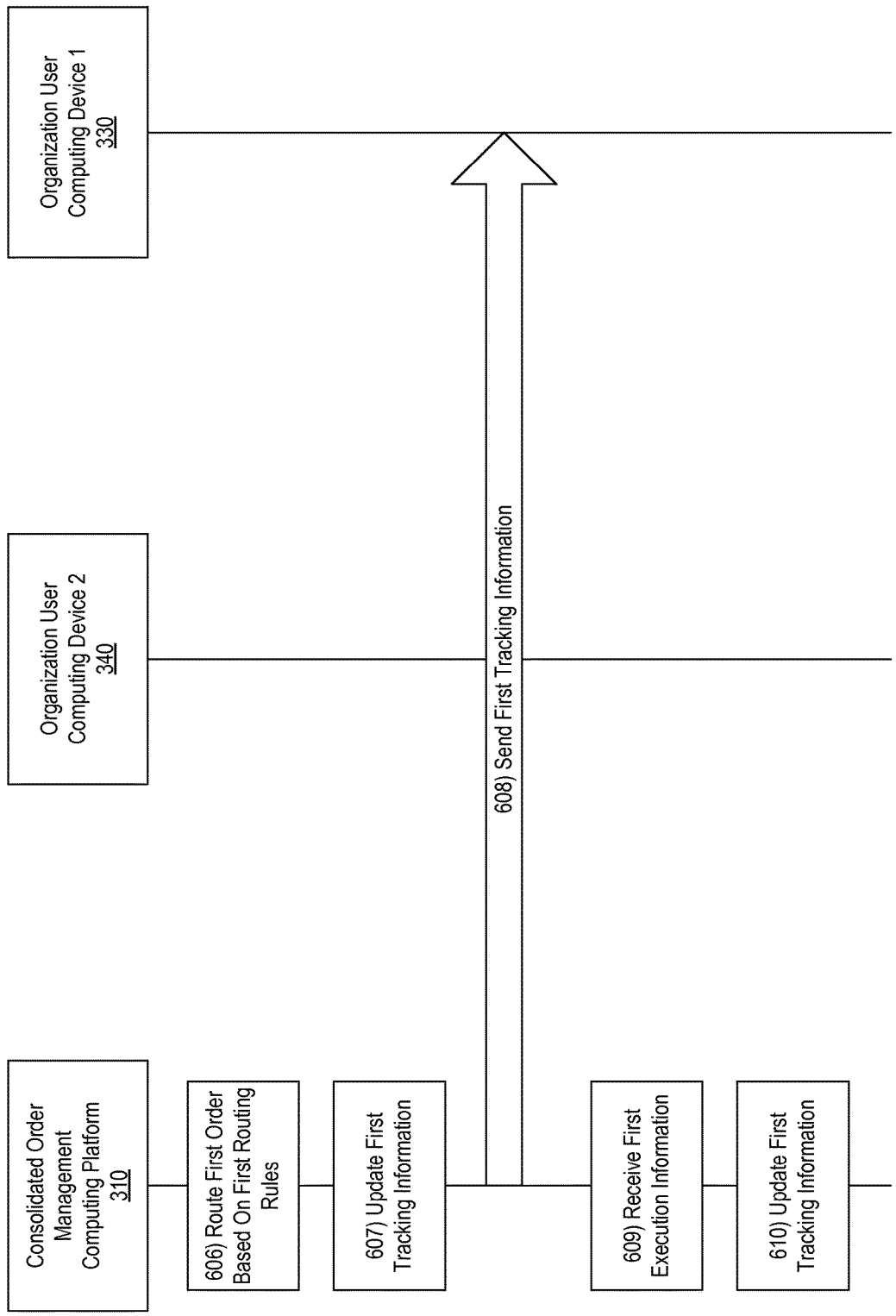

Referring to FIG. 6B, at step 606, consolidated order management computing platform 310 may route the first order based on the first set of routing rules. For example, at step 606, consolidated order management computing platform 310 may route the first order information associated with the first order created on the first organization user computing device (e.g., organization user computing device 330) and received from the first organization user computing device (e.g., organization user computing device 330) based on the first set of one or more routing rules loaded from the consolidated order management database (e.g., consolidated order management database 314).

At step 607, consolidated order management computing platform 310 may update first tracking information. For example, based on routing the first order information associated with the first order created on the first organization user computing device (e.g., organization user computing device 330) and received from the first organization user computing device (e.g., organization user computing device 330) based on the first set of one or more routing rules loaded from the consolidated order management database (e.g., consolidated order management database 314), consolidated order management computing platform 310 may, at step 607, update first tracking information in the consolidated order management database (e.g., consolidated order management database 314). Such tracking information may, for example, indicate and/or identify what specific routing rules were used in routing the first order, where and/or to what specific entity the first order was routed, when the first order was routed, what the current order status of the first order is, and/or the like.

In some embodiments, the first order information associated with the first order created on the first organization user computing device and received from the first organization user computing device may be routed to a first execution entity based on the first set of one or more routing rules loaded from the consolidated order management database. For example, the first order information associated with the first order created on the first organization user computing device (e.g., organization user computing device 330) and received from the first organization user computing device (e.g., organization user computing device 330) may be routed by consolidated order management computing platform 310 to a first execution entity based on the first set of one or more routing rules loaded from the consolidated order management database (e.g., consolidated order management database 314). For instance, the first order may include a trade in one or more securities, such as a buy trade or a sell trade, and the first execution entity may carry out the trade in one or more markets to execute and/or otherwise fulfill the order.

At step 608, consolidated order management computing platform 310 may send the first tracking information to organization user computing device 330. For example, after updating the first tracking information in the consolidated order management database (e.g., consolidated order management database 314), consolidated order management computing platform 310 may send, via the communication interface (e.g., communication interface 315), and to the first organization user computing device (e.g., organization user computing device 330), the first tracking information.

At step 609, consolidated order management computing platform 310 may receive first execution information. For example, at step 609, consolidated order management computing platform 310 may receive, via the communication interface (e.g., communication interface 315), and from a computing device associated with the first execution entity, first execution information associated with the first order information routed to the first execution entity based on the first set of one or more routing rules loaded from the consolidated order management database (e.g., consolidated order management database 314). At step 610, consolidated order management computing platform 310 may update the first tracking information. For example, at step 610, consolidated order management computing platform 310 may update the first tracking information in the consolidated order management database (e.g., consolidated order management database 314) based on the first execution information received from the computing device associated with the first execution entity.

Figure 6C:
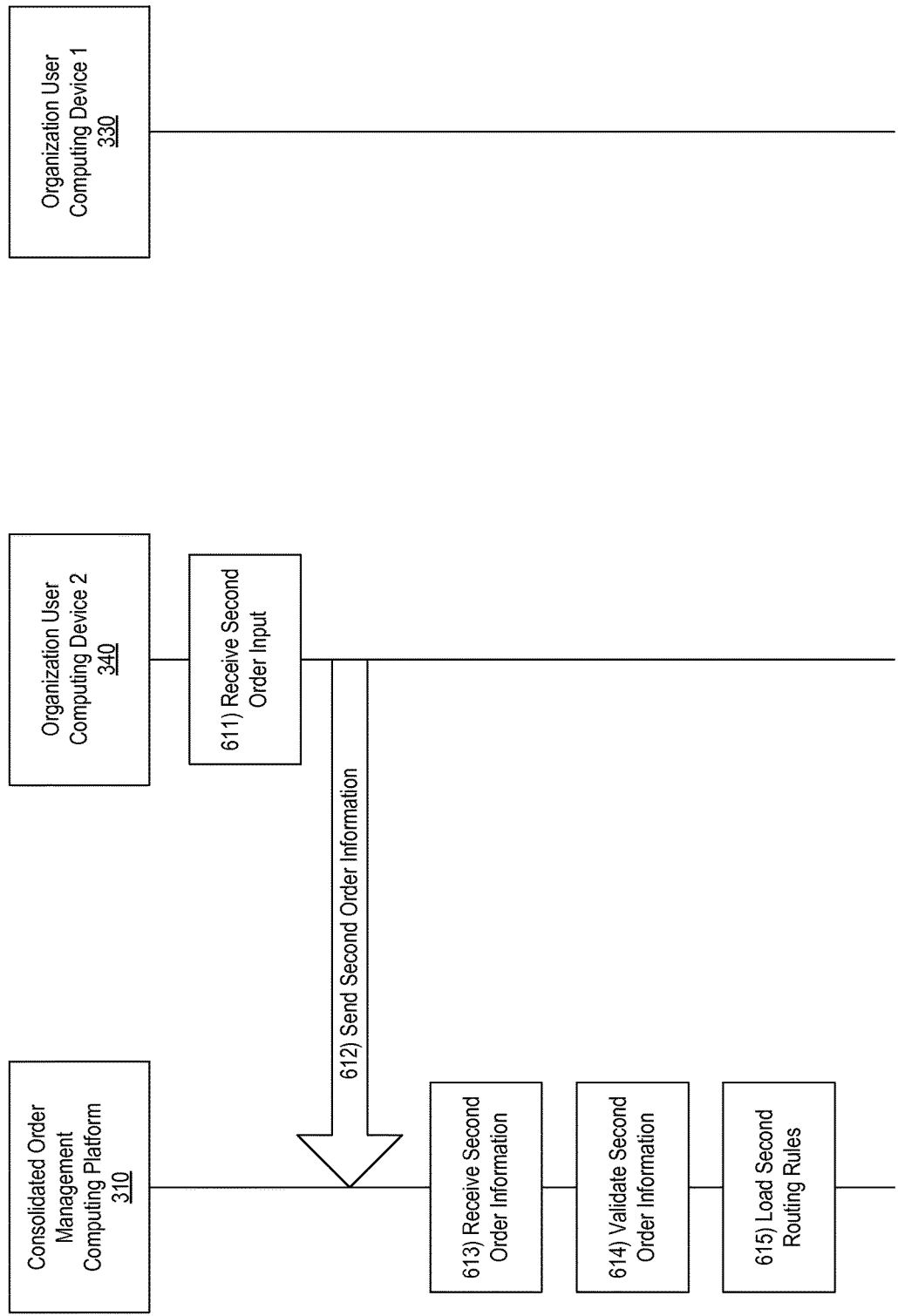

Referring to FIG. 6C, at step 611, organization user computing device 340 may receive second order input. At step 612, organization user computing device 340 may send second order information to consolidated order management computing platform 310.

At step 613, consolidated order management computing platform 310 may receive the second order information. For example, at step 613, consolidated order management computing platform 310 may receive, via the communication interface (e.g., communication interface 315), and from a second organization user computing device (e.g., organization user computing device 340), second order information associated with a second order created on the second organization user computing device (e.g., organization user computing device 340).

At step 614, consolidated order management computing platform 310 may validate the second order information. For example, at step 614, consolidated order management computing platform 310 may validate the second order information associated with the second order created on the second organization user computing device (e.g., organization user computing device 340) and received from the second organization user computing device (e.g., organization user computing device 340). For instance, consolidated order management computing platform 310 may validate the second order information using one or more validation rules loaded from consolidated order management database 314, as discussed above.

At step 615, consolidated order management computing platform 310 may load a second set of routing rules. For example, based on validating the second order information associated with the second order created on the second organization user computing device (e.g., organization user computing device 340) and received from the second organization user computing device (e.g., organization user computing device 340), consolidated order management computing platform 310 may, at step 615, load a second set of one or more routing rules from the consolidated order management database (e.g., consolidated order management database 314), and the second set of one or more routing rules may be different from the first set of one or more routing rules.

In some embodiments, loading the second set of one or more routing rules from the consolidated order management database may include selecting the second set of one or more routing rules from the consolidated order management database for use in routing the second order information associated with the second order created on the second organization user computing device and received from the second organization user computing device. For example, in loading the second set of one or more routing rules from the consolidated order management database (e.g., consolidated order management database 314), consolidated order management computing platform 310 may select the second set of one or more routing rules from the consolidated order management database (e.g., consolidated order management database 314) for use in routing the second order information associated with the second order created on the second organization user computing device (e.g., organization user computing device 340) and received from the second organization user computing device (e.g., organization user computing device 340). For instance, the second set of routing rules may be selected by consolidated order management computing platform 310 for use in routing the second order information based on the one or more channels, products, programs, accounts, or the like associated with the second order.

In some embodiments, the second set of one or more routing rules may be selected from the consolidated order management database for use in routing the second order information associated with the second order created on the second organization user computing device and received from the second organization user computing device based on second channel information identifying a second channel associated with the second order created on the second organization user computing device and received from the second organization user computing device, the second channel being different from the first channel. For example, the second set of one or more routing rules may be selected by consolidated order management computing platform 310 from the consolidated order management database (e.g., consolidated order management database 314) for use in routing the second order information associated with the second order created on the second organization user computing device (e.g., organization user computing device 340) and received from the second organization user computing device (e.g., organization user computing device 340) based on second channel information identifying a second channel associated with the second order created on the second organization user computing device (e.g., organization user computing device 340) and received from the second organization user computing device (e.g., organization user computing device 340), and the second channel may be different from the first channel.

In some embodiments, the second set of one or more routing rules may be selected from the consolidated order management database for use in routing the second order information associated with the second order created on the second organization user computing device and received from the second organization user computing device based on second product information identifying a second product associated with the second order created on the second organization user computing device and received from the second organization user computing device, the second product being different from the first product. For example, the second set of one or more routing rules may be selected by consolidated order management computing platform 310 from the consolidated order management database (e.g., consolidated order management database 314) for use in routing the second order information associated with the second order created on the second organization user computing device (e.g., organization user computing device 340) and received from the second organization user computing device (e.g., organization user computing device 340) based on second product information identifying a second product associated with the second order created on the second organization user computing device (e.g., organization user computing device 340) and received from the second organization user computing device (e.g., organization user computing device 340), and the second product may be different from the first product.

Figure 6D:
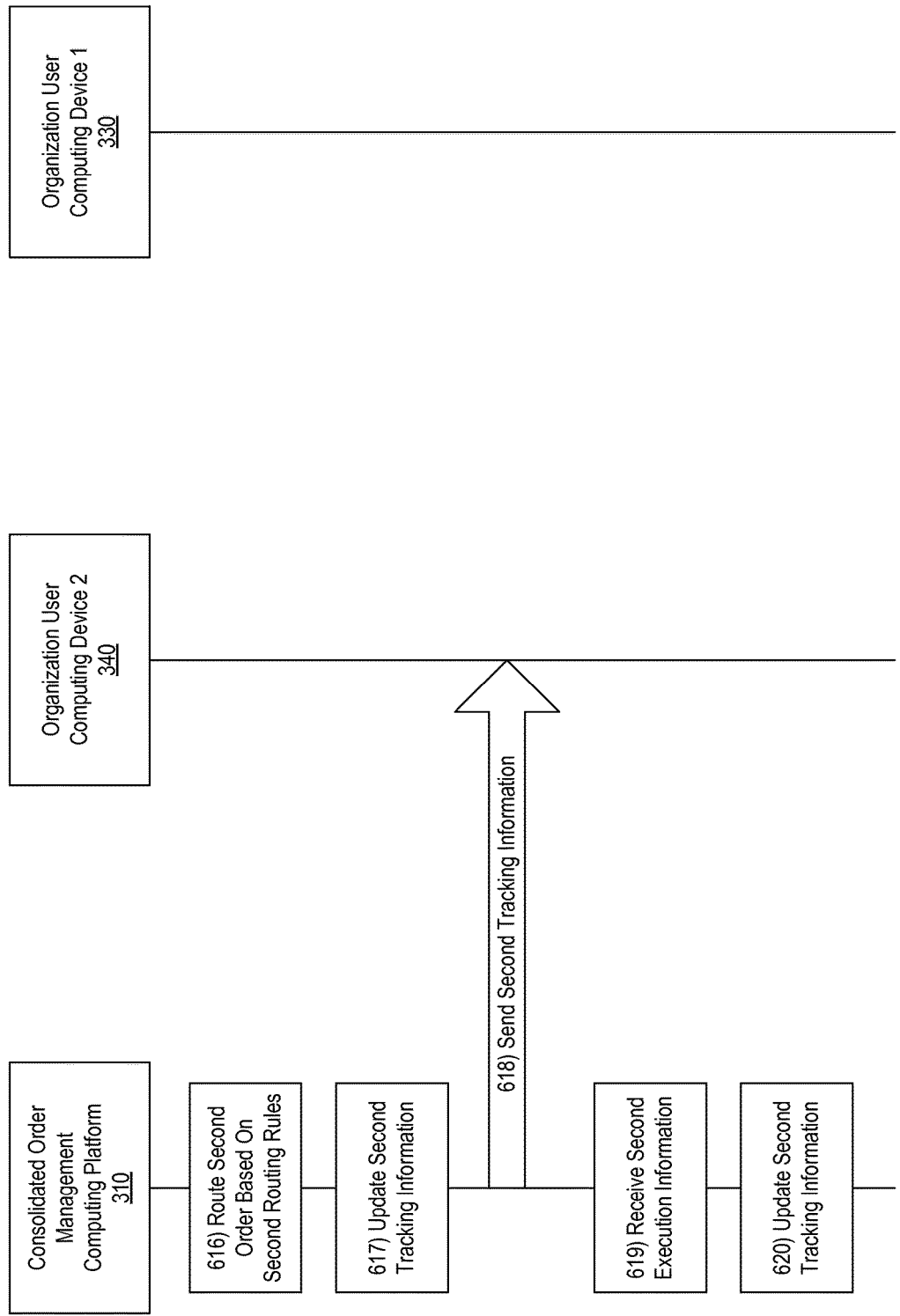

Referring to FIG. 6D, at step 616, consolidated order management computing platform 310 may route the second order based on the second set of routing rules. For example, at step 616, consolidated order management computing platform 310 may route the second order information associated with the second order created on the second organization user computing device (e.g., organization user computing device 340) and received from the second organization user computing device (e.g., organization user computing device 340) based on the second set of one or more routing rules loaded from the consolidated order management database (e.g., consolidated order management database 314).

At step 617, consolidated order management computing platform 310 may update second tracking information. For example, based on routing the second order information associated with the second order created on the second organization user computing device (e.g., organization user computing device 340) and received from the second organization user computing device (e.g., organization user computing device 340) based on the second set of one or more routing rules loaded from the consolidated order management database (e.g., consolidated order management database 314), consolidated order management computing platform 310 may update second tracking information in the consolidated order management database (e.g., consolidated order management database 314), and the second tracking information may be different from the first tracking information. Such tracking information may, for example, indicate and/or identify what specific routing rules were used in routing the second order, where and/or to what specific entity the second order was routed, when the second order was routed, what the current order status of the second order is, and/or the like.

In some embodiments, the second order information associated with the second order created on the second organization user computing device and received from the second organization user computing device may be routed to a second execution entity based on the second set of one or more routing rules loaded from the consolidated order management database, the second execution entity being different from the first execution entity. For example, the second order information associated with the second order created on the second organization user computing device (e.g., organization user computing device 340) and received from the second organization user computing device (e.g., organization user computing device 340) may be routed by consolidated order management computing platform 310 to a second execution entity based on the second set of one or more routing rules loaded from the consolidated order management database (e.g., consolidated order management database 314), and the second execution entity may be different from the first execution entity. For instance, the second order may include a trade in one or more securities different from the securities involved in the first order, such as a buy trade or a sell trade of such securities, and the second execution entity may carry out the trade in one or more markets to execute and/or otherwise fulfill the order.

At step 618, consolidated order management computing platform 310 may send the second tracking information to organization user computing device 340. For example, after updating the second tracking information in the consolidated order management database (e.g., consolidated order management database 314), consolidated order management computing platform 310 may send, via the communication interface (e.g., communication interface 315), and to the second organization user computing device (e.g., organization user computing device 340), the second tracking information.

At step 619, consolidated order management computing platform 310 may receive second execution information. For example, at step 619, consolidated order management computing platform 310 may receive, via the communication interface (e.g., communication interface 315), and from a computing device associated with the second execution entity, second execution information associated with the second order information routed to the second execution entity based on the second set of one or more routing rules loaded from the consolidated order management database (e.g., consolidated order management database 314). At step 620, consolidated order management computing platform 310 may update the second tracking information. For example, at step 620, consolidated order management computing platform 310 may update the second tracking information in the consolidated order management database (e.g., consolidated order management database 314) based on the second execution information received from the computing device associated with the second execution entity.

Figure 7A:
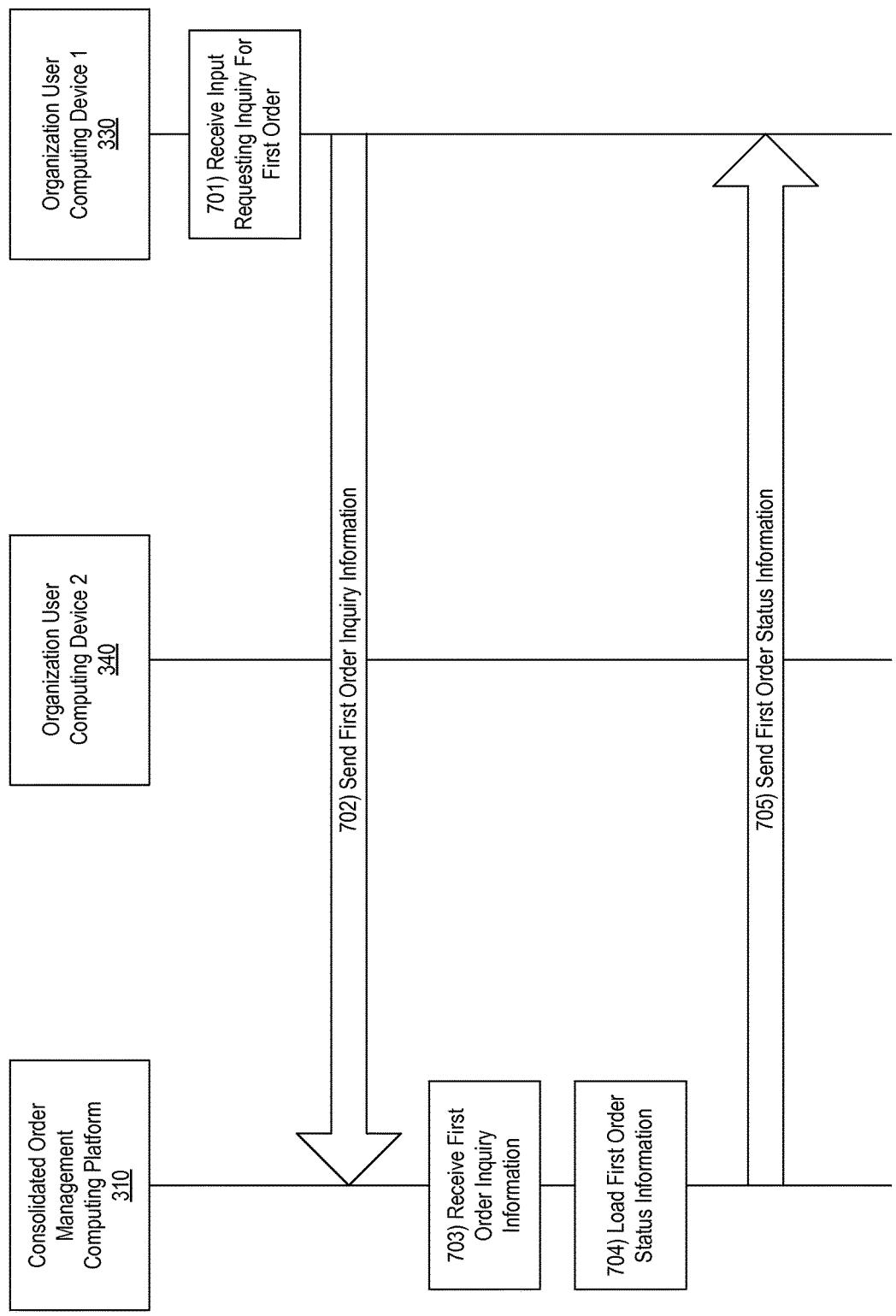
FIGS. 7A-7C depict an illustrative event sequence for providing consolidated order management using consolidated order inquiry tools in accordance with one or more example embodiments.
Figure 7B:
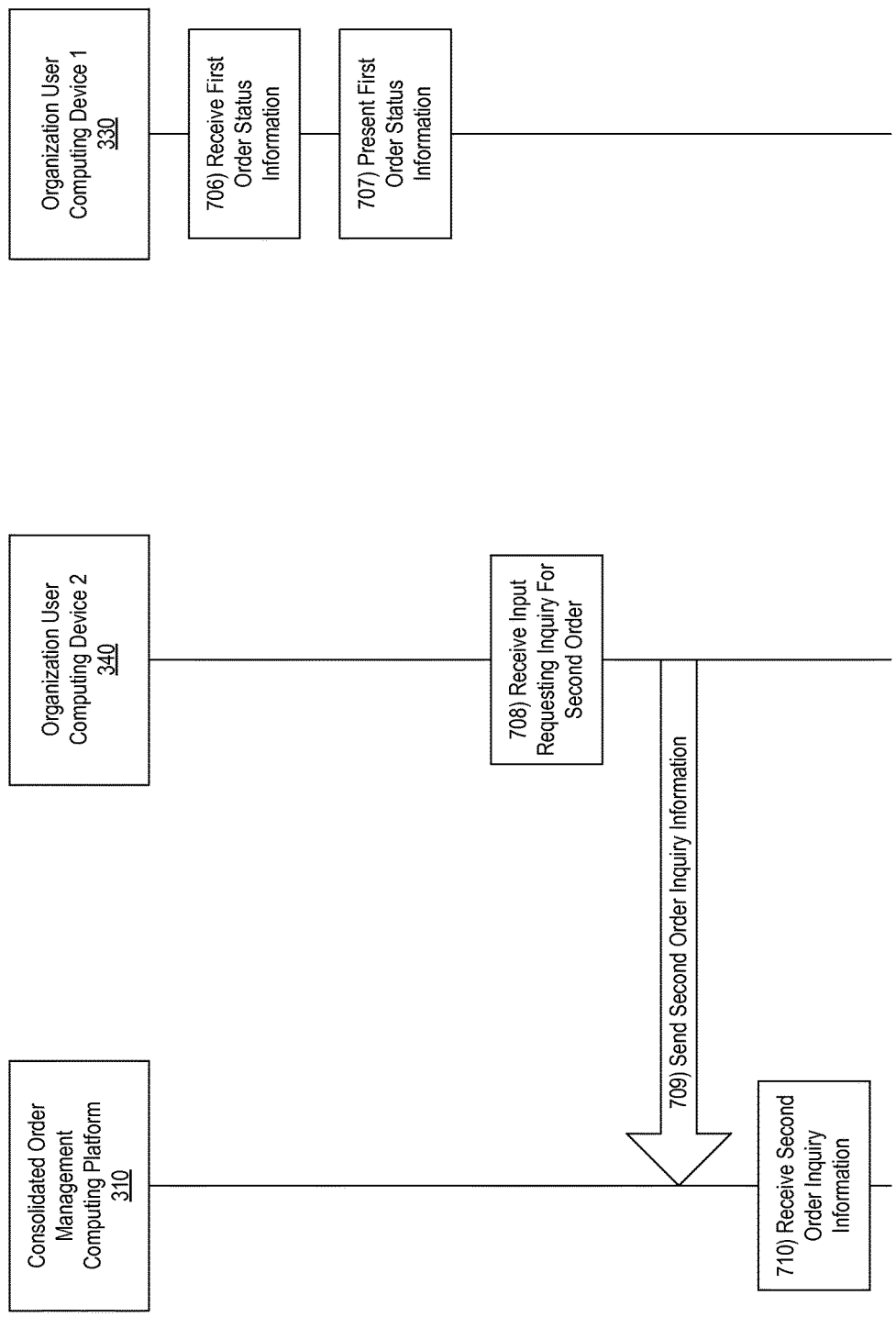
Figure 7C:
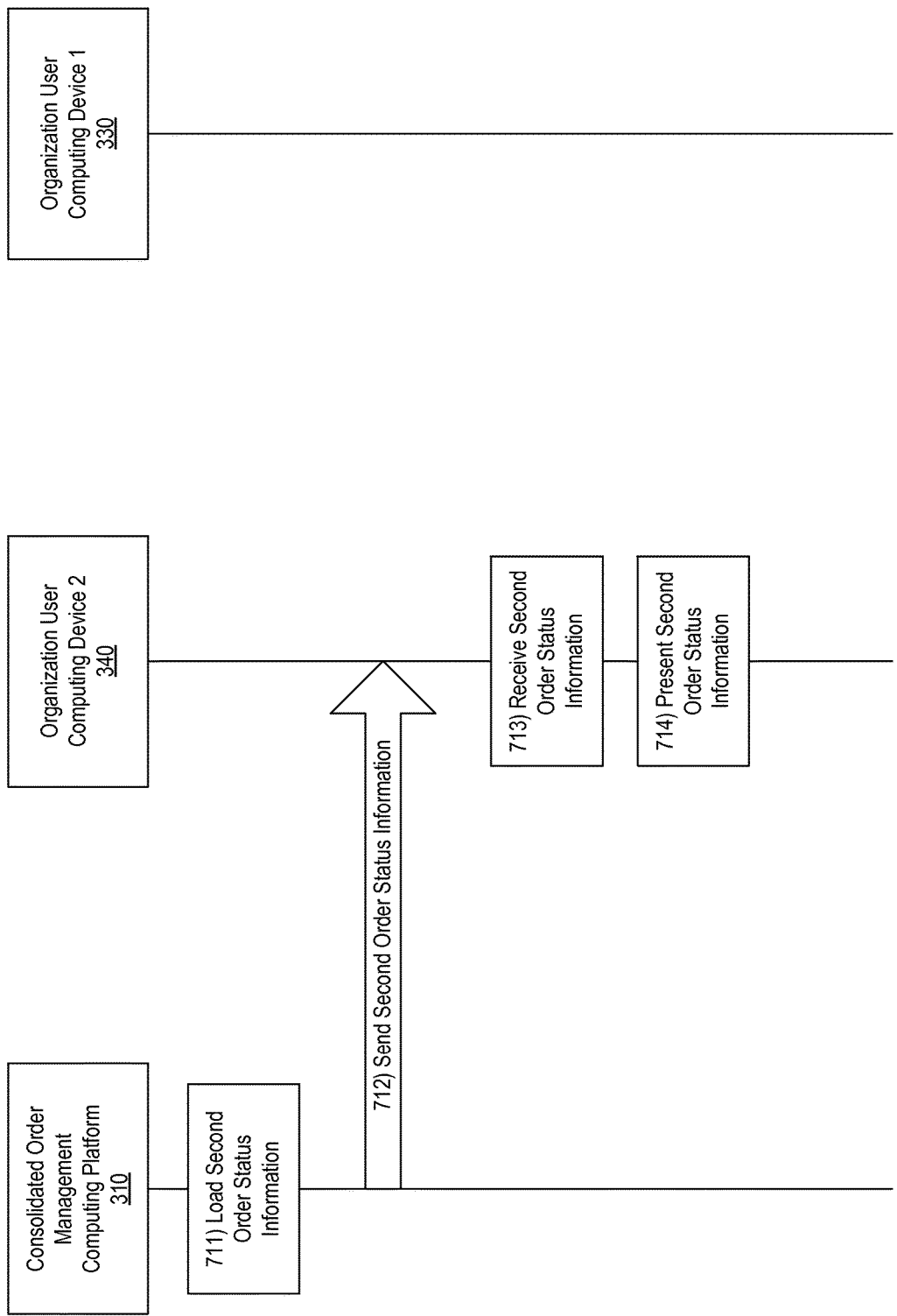

FIGS. 7A-7C depict an illustrative event sequence for providing consolidated order management using consolidated order inquiry tools in accordance with one or more example embodiments. Referring to FIG. 7A, at step 701, organization user computing device 330 may receive input requesting an inquiry for a first order. At step 702, organization user computing device 330 may send first order inquiry information to consolidated order management computing platform 310.

At step 703, consolidated order management computing platform 310 may receive first order inquiry information from organization user computing device 330. For example, at step 703, consolidated order management computing platform 310 may receive, via the communication interface (e.g., communication interface 315), and from a first organization user computing device (e.g., organization user computing device 330), first order inquiry information associated with a first order created on the first organization user computing device (e.g., organization user computing device 330).

At step 704, consolidated order management computing platform 310 may load first order status information. For example, based on receiving the first order inquiry information associated with the first order created on the first organization user computing device (e.g., organization user computing device 330) from the first organization user computing device (e.g., organization user computing device 330), consolidated order management computing platform 310 may load first order status information from a consolidated order management database (e.g., consolidated order management database 314). For instance, such status information may include information identifying a specific user that created the order, a specific time when the order was created, one or more specific products involved in the order, one or more specific accounts involved in the order, one or more specific transactions involved in the order, the nature of such transactions, and/or the like.

In some embodiments, the first order status information loaded from the consolidated order management database may include first order information associated with the first order created on the first organization user computing device and received via a first order interface generated based on first interface information loaded from the consolidated order management database. For example, the first order status information loaded from the consolidated order management database (e.g., consolidated order management database 314) by consolidated order management computing platform 310 may include first order information associated with the first order created on the first organization user computing device (e.g., organization user computing device 330) and received via a first order interface generated based on first interface information loaded from the consolidated order management database (e.g., consolidated order management database 314).

In some embodiments, the first order status information loaded from the consolidated order management database may include first validation information associated with the first order created on the first organization user computing device and generated based on a first set of one or more validation rules maintained in the consolidated order management database. For example, the first order status information loaded from the consolidated order management database (e.g., consolidated order management database 314) by consolidated order management computing platform 310 may include first validation information associated with the first order created on the first organization user computing device (e.g., organization user computing device 330) and generated based on a first set of one or more validation rules maintained in the consolidated order management database (e.g., consolidated order management database 314). For instance, the order status information may identify which specific validation rules were used to validate the order.

In some embodiments, the first order status information loaded from the consolidated order management database may include first routing information associated with the first order created on the first organization user computing device and generated based on a first set of one or more routing rules maintained in the consolidated order management database. For example, the first order status information loaded from the consolidated order management database (e.g., consolidated order management database 314) by consolidated order management computing platform 310 may include first routing information associated with the first order created on the first organization user computing device (e.g., organization user computing device 330) and generated based on a first set of one or more routing rules maintained in the consolidated order management database (e.g., consolidated order management database 314). For instance, the order status information may identify which routing rules were used to route the order.

In some embodiments, the first order status information loaded from the consolidated order management database may include information identifying one or more computer systems that processed the first order created on the first organization user computing device. For example, the first order status information loaded from the consolidated order management database (e.g., consolidated order management database 314) by consolidated order management computing platform 310 may include information identifying one or more computer systems that processed the first order created on the first organization user computing device (e.g., organization user computing device 330).

In some embodiments, the first order status information loaded from the consolidated order management database may include information identifying one or more applications used to define the first order created on the first organization user computing device. For example, the first order status information loaded from the consolidated order management database (e.g., consolidated order management database 314) by consolidated order management computing platform 310 may include information identifying one or more applications used to define the first order created on the first organization user computing device (e.g., organization user computing device 330).

In some embodiments, the first order status information loaded from the consolidated order management database may include execution information identifying an execution status of the first order created on the first organization user computing device. For example, the first order status information loaded from the consolidated order management database (e.g., consolidated order management database 314) by consolidated order management computing platform 310 may include execution information identifying an execution status of the first order created on the first organization user computing device (e.g., organization user computing device 330).

In some embodiments, the first order status information loaded from the consolidated order management database may include execution entity information identifying an execution entity to which the first order created on the first organization user computing device was routed. For example, the first order status information loaded from the consolidated order management database (e.g., consolidated order management database 314) by consolidated order management computing platform 310 may include execution entity information identifying an execution entity to which the first order created on the first organization user computing device (e.g., organization user computing device 330) was routed (e.g., by consolidated order management computing platform 310).

At step 705, consolidated order management computing platform 310 may send the first order status information to organization user computing device 330. For example, at step 705, consolidated order management computing platform 310 may send, via the communication interface (e.g., communication interface 315), and to the first organization user computing device (e.g., organization user computing device 330), the first order status information loaded from the consolidated order management database (e.g., consolidated order management database 314).

Referring to FIG. 7B, at step 706, organization user computing device 330 may receive the first order status information from consolidated order management computing platform 310. At step 707, organization user computing device 330 may present the first order status information.

At step 708, organization user computing device 340 may receive input requesting an inquiry for a second order. At step 709, organization user computing device 340 may send second order inquiry information to consolidated order management computing platform 310.

At step 710, consolidated order management computing platform 310 may receive the second order inquiry information from organization user computing device 340. For example, at step 710, consolidated order management computing platform 310 may receive, via the communication interface (e.g., communication interface 315), and from a second organization user computing device (e.g., organization user computing device 340), second order inquiry information associated with a second order created on the second organization user computing device (e.g., organization user computing device 340).

Referring to FIG. 7C, at step 711, consolidated order management computing platform 310 may load second order status information. For example, based on receiving the second order inquiry information associated with the second order created on the second organization user computing device (e.g., organization user computing device 340) from the second organization user computing device (e.g., organization user computing device 340), consolidated order management computing platform 310 may load second order status information from the consolidated order management database (e.g., consolidated order management database 314).

In some embodiments, the second order status information loaded from the consolidated order management database may include second order information associated with the second order created on the second organization user computing device and received via a second order interface generated based on second interface information loaded from the consolidated order management database, the second order interface generated based on the second interface information loaded from the consolidated order management database being different from the first order interface generated based on the first interface information loaded from the consolidated order management database. For example, the second order status information loaded from the consolidated order management database (e.g., consolidated order management database 314) by consolidated order management computing platform 310 may include second order information associated with the second order created on the second organization user computing device (e.g., organization user computing device 340) and received via a second order interface generated based on second interface information loaded from the consolidated order management database (e.g., consolidated order management database 314). In addition, the second order interface generated based on the second interface information loaded from the consolidated order management database (e.g., consolidated order management database 314) may, for instance, be different from the first order interface generated based on the first interface information loaded from the consolidated order management database (e.g., consolidated order management database 314).

In some embodiments, the second order status information loaded from the consolidated order management database may include second validation information associated with the second order created on the second organization user computing device and generated based on a second set of one or more validation rules maintained in the consolidated order management database, the second set of one or more validation rules maintained in the consolidated order management database being different from the first set of one or more validation rules maintained in the consolidated order management database. For example, the second order status information loaded from the consolidated order management database (e.g., consolidated order management database 314) by consolidated order management computing platform 310 may include second validation information associated with the second order created on the second organization user computing device (e.g., organization user computing device 340) and generated based on a second set of one or more validation rules maintained in the consolidated order management database (e.g., consolidated order management database 314). In addition, the second set of one or more validation rules maintained in the consolidated order management database (e.g., consolidated order management database 314) may, for instance, be different from the first set of one or more validation rules maintained in the consolidated order management database (e.g., consolidated order management database 314).

In some embodiments, the second order status information loaded from the consolidated order management database may include second routing information associated with the second order created on the second organization user computing device and generated based on a second set of one or more routing rules maintained in the consolidated order management database, the second set of one or more routing rules maintained in the consolidated order management database being different from the first set of one or more routing rules maintained in the consolidated order management database. For example, the second order status information loaded from the consolidated order management database (e.g. consolidated order management database 314) by consolidated order management computing platform 310 may include second routing information associated with the second order created on the second organization user computing device (e.g., organization user computing device 340) and generated based on a second set of one or more routing rules maintained in the consolidated order management database (e.g., consolidated order management database 314). In addition, the second set of one or more routing rules maintained in the consolidated order management database (e.g., consolidated order management database 314) may, for instance, be different from the first set of one or more routing rules maintained in the consolidated order management database (e.g., consolidated order management database 314).

At step 712, consolidated order management computing platform 310 may send the second order status information to organization user computing device 340. For example, at step 712, consolidated order management computing platform 310 may send, via the communication interface (e.g., communication interface 315), and to the second organization user computing device (e.g., organization user computing device 340), the second order status information loaded from the consolidated order management database (e.g., consolidated order management database 314).

At step 713, organization user computing device 340 may receive the second order status information from consolidated order management computing platform 310. At step 714, organization user computing device 340 may present the second order status information.

Figure 8A:
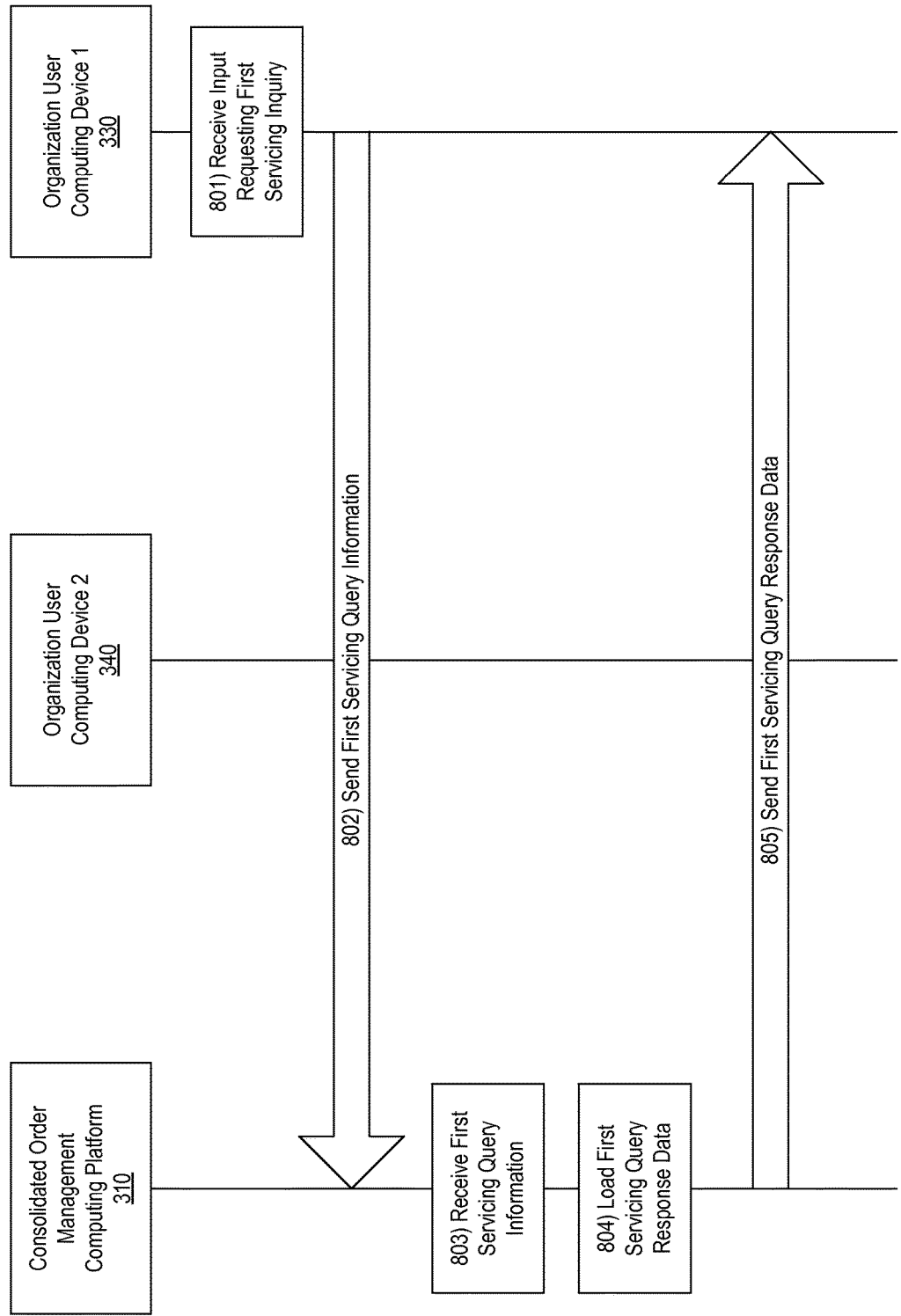
Figure 8B:
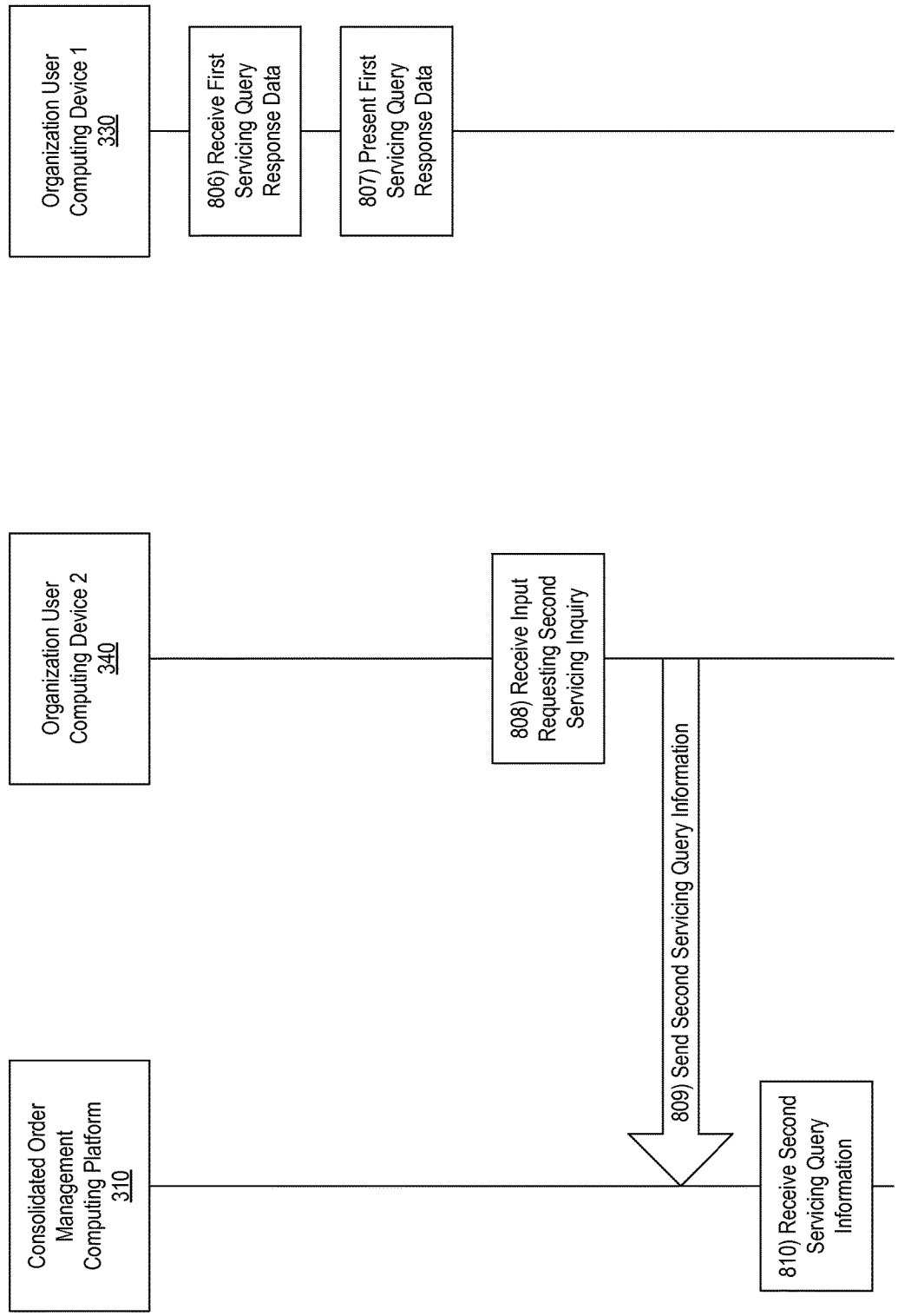

FIGS. 8A-8C depict an illustrative event sequence for providing consolidated order management using consolidated servicing tools in accordance with one or more example embodiments.

Referring to FIG. 8A, at step 801, organization user computing device 330 may receive input requesting a first servicing inquiry. At step 802, organization user computing device 330 may send first servicing query information to consolidated order management computing platform 310.

At step 803, consolidated order management computing platform 310 may receive the first servicing query information from organization user computing device 330. For example, at step 803, consolidated order management computing platform 310 may receive, via the communication interface (e.g., communication interface 315), and from a first organization user computing device (e.g., organization user computing device 330), first servicing query information corresponding to a first query associated with a first set of completed orders.

At step 804, consolidated order management computing platform 310 may load first servicing query response data. For example, based on receiving the first servicing query information corresponding to the first query associated with the first set of completed orders from the first organization user computing device (e.g., organization user computing device 330), consolidated order management computing platform 310 may, at step 804, load first servicing query response data from a consolidated order management database (e.g., consolidated order management database 314).

In some embodiments, the first servicing query response data loaded from the consolidated order management database may include order entry data associated with the first set of completed orders and received via one or more interfaces generated based on interface information maintained in the consolidated order management database. For example, the first servicing query response data loaded from the consolidated order management database (e.g., consolidated order management database 314) by consolidated order management computing platform 310 may include order entry data associated with the first set of completed orders and received via one or more interfaces generated based on interface information maintained in the consolidated order management database (e.g., consolidated order management database 314).

In some embodiments, the first servicing query response data loaded from the consolidated order management database may include order execution data associated with the first set of completed orders and received from one or more execution entities to which the first set of completed orders was routed based on one or more routing rules maintained in the consolidated order management database. For example, the first servicing query response data loaded from the consolidated order management database (e.g., consolidated order management database 314) by consolidated order management computing platform 310 may include order execution data associated with the first set of completed orders and received from one or more execution entities to which the first set of completed orders was routed (e.g., by consolidated order management computing platform 310) based on one or more routing rules maintained in the consolidated order management database (e.g., consolidated order management database 314).

In some embodiments, the first servicing query response data loaded from the consolidated order management database may include order booking data associated with the first set of completed orders and received via one or more booking interfaces generated based on interface information maintained in the consolidated order management database. For example, the first servicing query response data loaded from the consolidated order management database (e.g., consolidated order management database 314) by consolidated order management computing platform 310 may include order booking data associated with the first set of completed orders and received via one or more booking interfaces generated based on interface information maintained in the consolidated order management database (e.g., consolidated order management database 314). For instance, such order booking data may indicate how one or more orders were booked in regards to one or more internal financial accounts maintained by an organization, such as a financial institution associated with consolidated order management computing platform 310.

In some embodiments, the first servicing query response data loaded from the consolidated order management database may include order allocation data associated with the first set of completed orders and received via one or more allocation interfaces generated based on interface information maintained in the consolidated order management database. For example, the first servicing query response data loaded from the consolidated order management database (e.g., consolidated order management database 314) by consolidated order management computing platform 310 may include order allocation data associated with the first set of completed orders and received via one or more allocation interfaces generated based on interface information maintained in the consolidated order management database (e.g., consolidated order management database 314). For instance, such allocation data may indicate how one or more orders (which may, e.g., include different securities) were allocated across one or more different funds and/or financial accounts maintained by an organization, such as a financial institution associated with consolidated order management computing platform 310.

In some embodiments, the first servicing query response data loaded from the consolidated order management database may include account history information for a plurality of financial accounts associated with the first set of completed orders. For example, the first servicing query response data loaded from the consolidated order management database (e.g., consolidated order management database 314) by consolidated order management computing platform 310 may include account history information for a plurality of financial accounts associated with the first set of completed orders. Such account history information may, for instance, include information identifying, for each account of the plurality of financial accounts, the account state and/or type at time of one or more orders, the current account state and/or type, and/or other information associated with the history of the particular account.

In some embodiments, the first servicing query response data loaded from the consolidated order management database may include order history information for at least one order associated with the first set of completed orders. For example, the first servicing query response data loaded from the consolidated order management database (e.g., consolidated order management database 314) by consolidated order management computing platform 310 may include order history information for at least one order associated with the first set of completed orders. Such order history information may, for instance, include, for each order of the first set of completed orders, information identifying one or more warnings displayed during the particular ordering process (e.g., to the customer, to the financial advisor, or the like), the pricing information that was available and/or presented during the particular ordering process, and/or other information associated with the history of the particular order.

At step 805, consolidated order management computing platform 310 may send the first servicing query response data to organization user computing device 330. For example, at step 805, consolidated order management computing platform 310 may send, via the communication interface (e.g., communication interface 315), and to the first organization user computing device (e.g., organization user computing device 330), the first servicing query response data loaded from the consolidated order management database (e.g., consolidated order management database 314).

Referring to FIG. 8B, at step 806, organization user computing device 330 may receive the first servicing query response data from consolidated order management computing platform 310. At step 807, organization user computing device 330 may present the first servicing query response data.

At step 808, organization user computing device 340 may receive input requesting a second servicing inquiry. At step 809, organization user computing device 340 may send second servicing query information to consolidated order management computing platform 310.

At step 810, consolidated order management computing platform 310 may receive the second servicing query information from organization user computing device 340. For example, at step 810, consolidated order management computing platform 310 may receive, via the communication interface (e.g., communication interface 315), and from a second organization user computing device (e.g., organization user computing device 340), second servicing query information corresponding to a second query associated with a second set of completed orders, the second set of completed orders being different from the first set of completed orders.

Referring to FIG. 8C, at step 811, consolidated order management computing platform 310 may load second servicing query response data. For example, based on receiving the second servicing query information corresponding to the second query associated with the second set of completed orders from the second organization user computing device (e.g., organization user computing device 340), consolidated order management computing platform 310 may, at step 811, load second servicing query response data from the consolidated order management database (e.g., consolidated order management database 314).

At step 812, consolidated order management computing platform 310 may send the second servicing query response data to organization user computing device 340. For example, at step 812, consolidated order management computing platform 310 may send, via the communication interface (e.g., communication interface 315), and to the second organization user computing device (e.g., organization user computing device 340), the second servicing query response data loaded from the consolidated order management database (e.g., consolidated order management database 314).

At step 813, organization user computing device 340 may receive the second servicing query response data from consolidated order management computing platform 310. At step 814, organization user computing device 340 may present the second servicing query response data.

Figure 9:
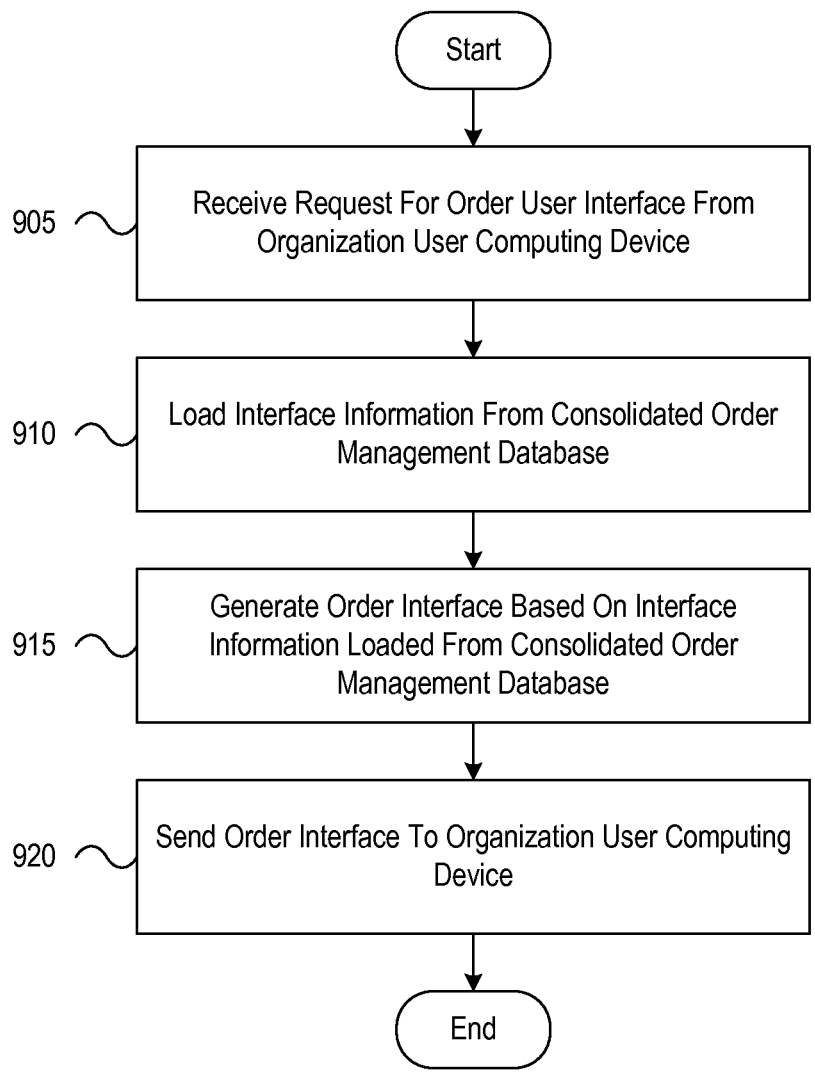
FIG. 9 depicts an illustrative method for providing consolidated order management using consolidated order interfaces in accordance with one or more example embodiments.

FIG. 9 depicts an illustrative method for providing consolidated order management using consolidated order interfaces in accordance with one or more example embodiments. Referring to FIG. 9, at step 905, a computing platform may receive, via a communication interface, and from a first organization user computing device, a first request for a first order user interface. At step 910, based on receiving the first request for the first order user interface from the first organization user computing device, the computing platform may load first interface information from a consolidated order management database. At step 915, the computing platform may generate a first order interface based on the first interface information loaded from the consolidated order management database. At step 920, the computing platform may send, via the communication interface, and to the first organization user computing device, the first order interface generated based on the first interface information loaded from the consolidated order management database.

Figure 10:
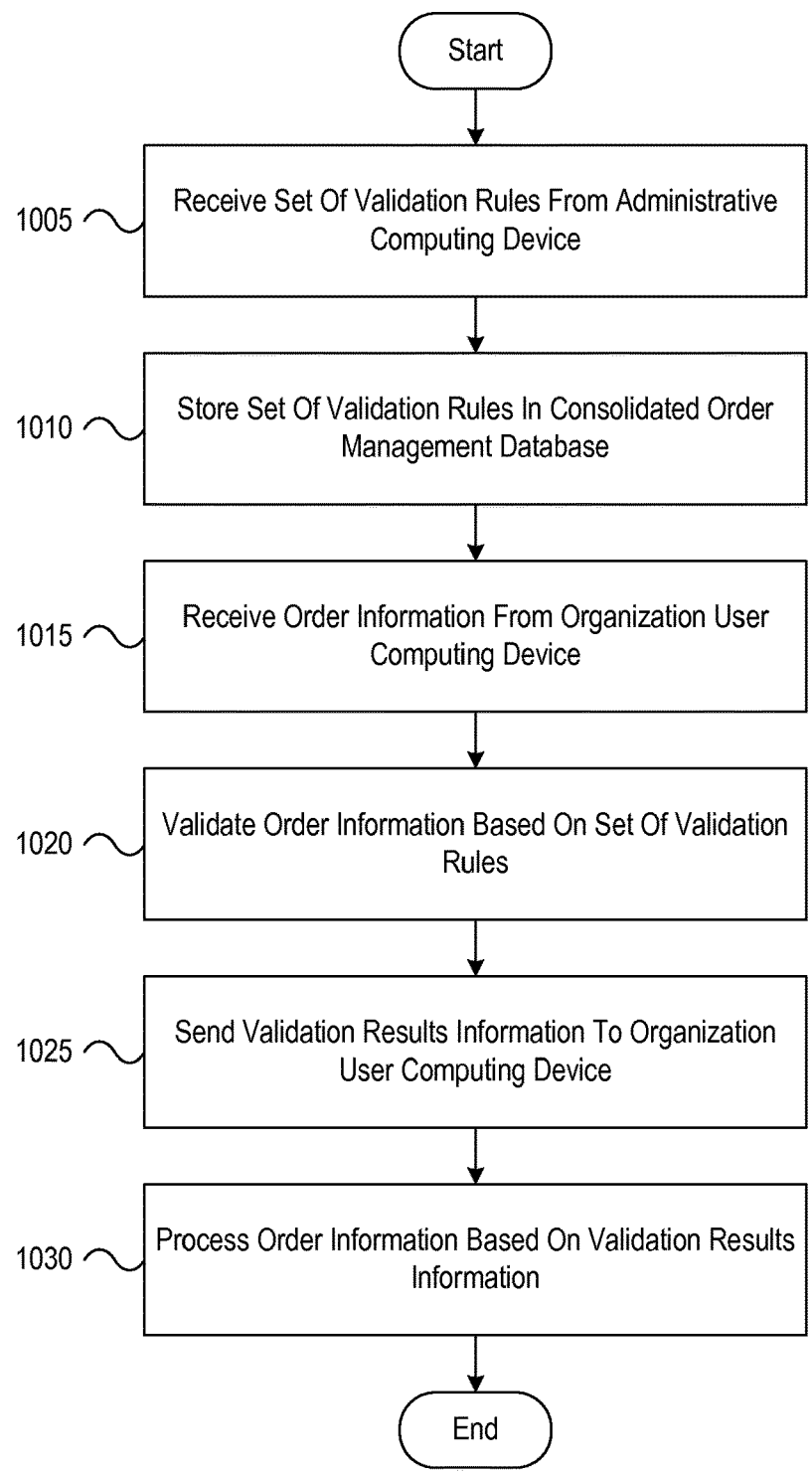
FIG. 10 depicts an illustrative method for providing consolidated order management using consolidated validation rules in accordance with one or more example embodiments.

FIG. 10 depicts an illustrative method for providing consolidated order management using consolidated validation rules in accordance with one or more example embodiments. At step 1005, a computing platform may receive, via a communication interface, and from an administrative computing device associated with an organization, a first set of one or more validation rules. At step 1010, based on receiving the first set of one or more validation rules from the administrative computing device associated with the organization, the computing platform may store the first set of one or more validation rules received from the administrative computing device associated with the organization in a consolidated order management database. At step 1015, the computing platform may receive, via the communication interface, and from a first organization user computing device, first order information associated with a first order created on the first organization user computing device. At step 1020, the computing platform may validate the first order information received from the first organization user computing device based on the first set of one or more validation rules stored in the consolidated order management database. At step 1025, based on validating the first order information received from the first organization user computing device based on the first set of one or more validation rules stored in the consolidated order management database, the computing platform may send, via the communication interface, to the first organization user computing device, first validation results information. At step 1030, the computing platform may process the first order information received from the first organization user computing device based on the first validation results information.

Figure 11:
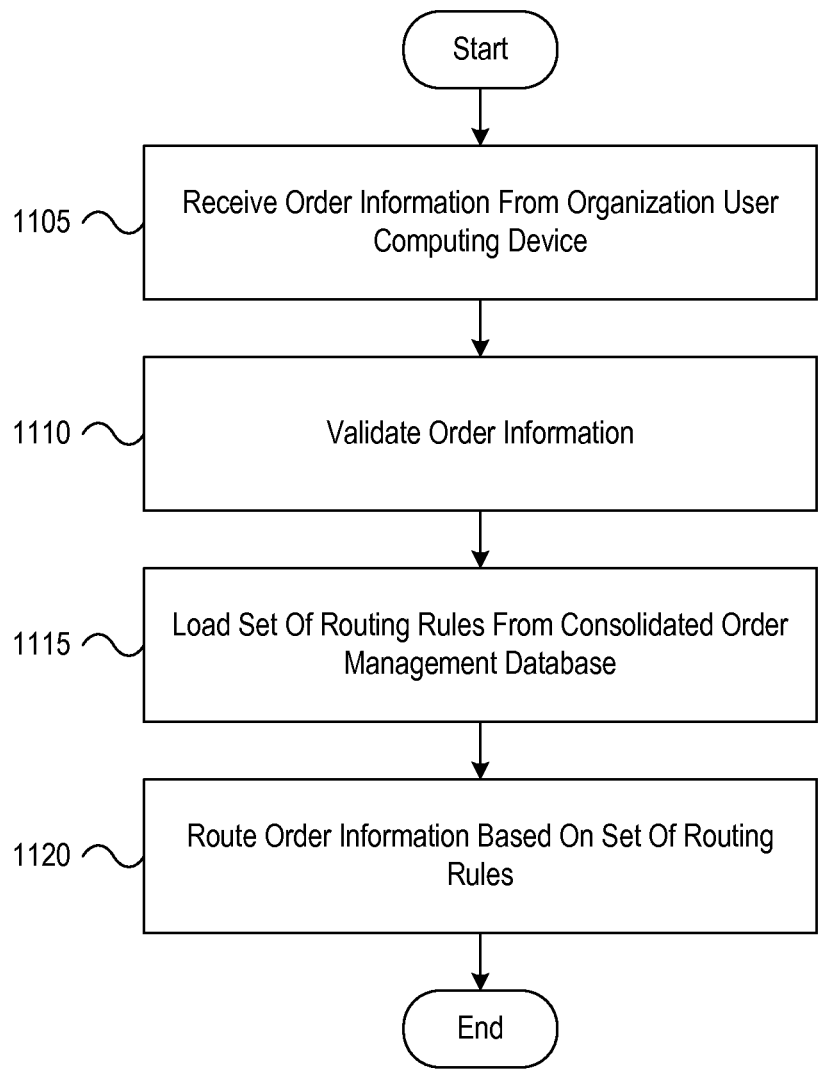
FIG. 11 depicts an illustrative method for providing consolidated order management using consolidated routing rules in accordance with one or more example embodiments.

FIG. 11 depicts an illustrative method for providing consolidated order management using consolidated routing rules in accordance with one or more example embodiments. At step 1105, a computing platform may receive, via a communication interface, and from a first organization user computing device, first order information associated with a first order created on the first organization user computing device. At step 1110, the computing platform may validate the first order information associated with the first order created on the first organization user computing device and received from the first organization user computing device. At step 1115, based on validating the first order information associated with the first order created on the first organization user computing device and received from the first organization user computing device, the computing platform may load a first set of one or more routing rules from a consolidated order management database. At step 1120, the computing platform may route the first order information associated with the first order created on the first organization user computing device and received from the first organization user computing device based on the first set of one or more routing rules loaded from the consolidated order management database.

Figure 12:
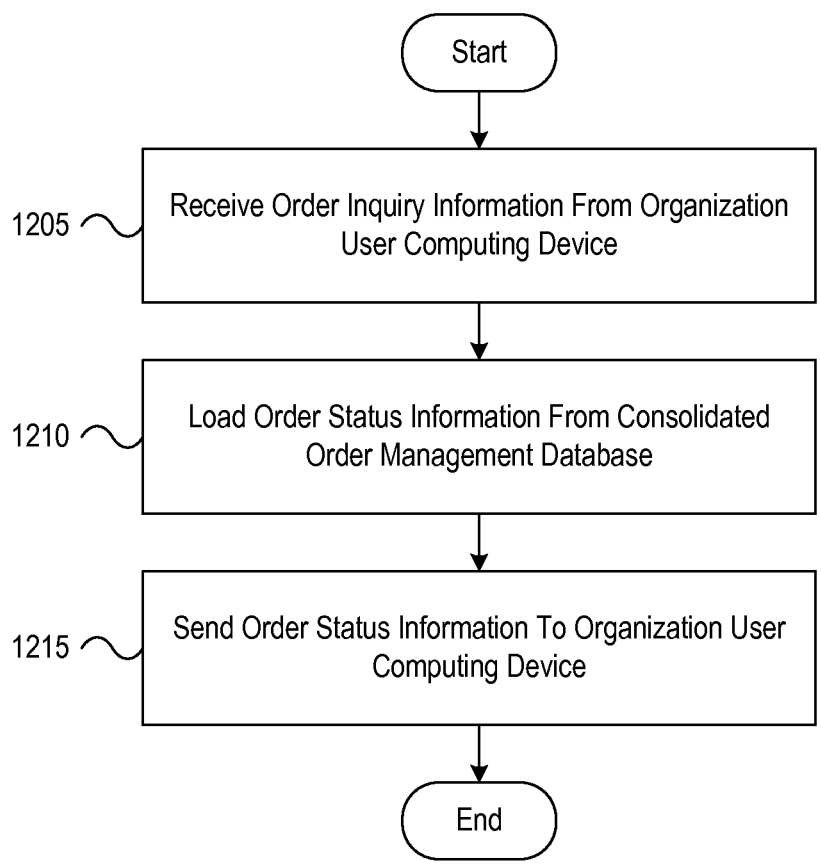
FIG. 12 depicts an illustrative method for providing consolidated order management using consolidated order inquiry tools in accordance with one or more example embodiments.

FIG. 12 depicts an illustrative method for providing consolidated order management using consolidated order inquiry tools in accordance with one or more example embodiments. At step 1205, a computing platform may receive, via a communication interface, and from a first organization user computing device, first order inquiry information associated with a first order created on the first organization user computing device. At step 1210, based on receiving the first order inquiry information associated with the first order created on the first organization user computing device from the first organization user computing device, the computing platform may load first order status information from a consolidated order management database. At step 1215, the computing platform may send, via the communication interface, and to the first organization user computing device, the first order status information loaded from the consolidated order management database.

Figure 13:
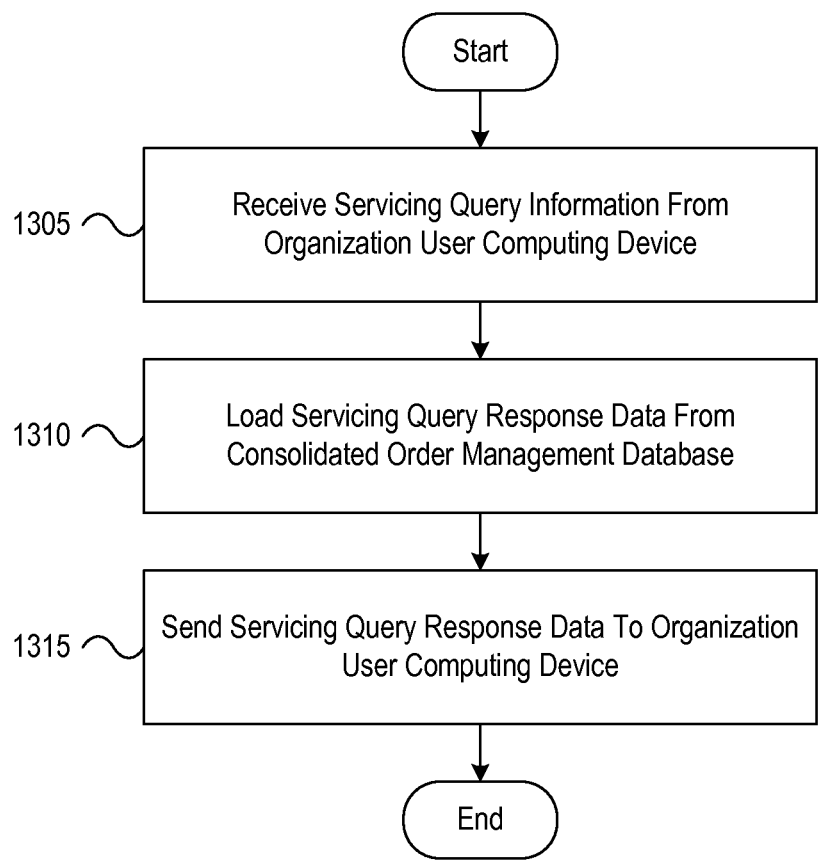
FIG. 13 depicts an illustrative method for providing consolidated order management using consolidated servicing tools in accordance with one or more example embodiments.

FIG. 13 depicts an illustrative method for providing consolidated order management using consolidated servicing tools in accordance with one or more example embodiments. At step 1305, a computing platform may receive, via the communication interface, and from a first organization user computing device, first servicing query information corresponding to a first query associated with a first set of completed orders. At step 1310, based on receiving the first servicing query information corresponding to the first query associated with the first set of completed orders from the first organization user computing device, the computing platform may load first servicing query response data from a consolidated order management database. At step 1315, the computing platform may send, via the communication interface, and to the first organization user computing device, the first servicing query response data loaded from the consolidated order management database.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system, comprising:
   at least one processor;
   a communication interface communicatively coupled to the at least one processor; and
   memory storing computer-readable instructions that, when executed by the at least one processor, cause the system to:
   receive, via the communication interface, and from a first organization user computing device, first order information associated with a first order created on the first organization user computing device, wherein the first order created on the first organization user computing device comprises a trade in one or more securities, and wherein the first order information received from the first organization user computing device comprises information identifying the trade in the one or more securities;
   validate the first order information associated with the first order created on the first organization user computing device and received from the first organization user computing device based on a first set of one or more validation rules stored in a consolidated order management database;
   based on validating the first order information associated with the first order created on the first organization user computing device and received from the first organization user computing device, load a first set of one or more routing rules from the consolidated order management database;
   route the first order information associated with the first order created on the first organization user computing device and received from the first organization user computing device based on the first set of one or more routing rules loaded from the consolidated order management database; and
   based on routing the first order information associated with the first order created on the first organization user computing device and received from the first organization user computing device based on the first set of one or more routing rules loaded from the consolidated order management database, update first tracking information in the consolidated order management database,
   wherein the first order information associated with the first order created on the first organization user computing device and received from the first organization user computing device is routed to a first execution entity based on the first set of one or more routing rules loaded from the consolidated order management database,
   wherein routing the first order information associated with the first order created on the first organization user computing device and received from the first organization user computing device to the first execution entity based on the first set of one or more routing rules loaded from the consolidated order management database causes the first execution entity to carry out the trade in the one or more securities,
   wherein validating the first order information associated with the first order created on the first organization user computing device and received from the first organization user computing device comprises selecting the first set of one or more validation rules stored in the consolidated order management database for validating the first order information associated with the first order,
   wherein the first set of one or more validation rules stored in the consolidated order management database comprises one or more channel rules for a first channel associated with the first order, and
   wherein the first set of one or more validation rules stored in the consolidated order management database comprises one or more product rules for a first product associated with the first order.

2. The system of claim 1, wherein loading the first set of one or more routing rules from the consolidated order management database comprises selecting the first set of one or more routing rules from the consolidated order management database for use in routing the first order information associated with the first order created on the first organization user computing device and received from the first organization user computing device.

3. The system of claim 2, wherein the first set of one or more routing rules are selected from the consolidated order management database for use in routing the first order information associated with the first order created on the first organization user computing device and received from the first organization user computing device based on first channel information identifying the first channel associated with the first order.

4. The system of claim 2, wherein the first set of one or more routing rules are selected from the consolidated order management database for use in routing the first order information associated with the first order created on the first organization user computing device and received from the first organization user computing device based on first product information identifying the first product associated with the first order.

5. The system of claim 1, wherein the memory stores additional computer-readable instructions that, when executed by the at least one processor, further cause the system to:
   after updating the first tracking information in the consolidated order management database, send, via the communication interface, and to the first organization user computing device, the first tracking information.

6. The system of claim 1, wherein the memory stores additional computer-readable instructions that, when executed by the at least one processor, further cause the system to:
   receive, via the communication interface, and from a computing device associated with the first execution entity, first execution information associated with the first order information routed to the first execution entity based on the first set of one or more routing rules loaded from the consolidated order management database; and
   update the first tracking information in the consolidated order management database based on the first execution information received from the computing device associated with the first execution entity.

7. The system of claim 6, wherein the memory stores additional computer-readable instructions that, when executed by the at least one processor, further cause the system to:
receive, via the communication interface, and from a second organization user computing device, second order information associated with a second order created on the second organization user computing device;
validate the second order information associated with the second order created on the second organization user computing device and received from the second organization user computing device;
based on validating the second order information associated with the second order created on the second organization user computing device and received from the second organization user computing device, load a second set of one or more routing rules from the consolidated order management database, the second set of one or more routing rules being different from the first set of one or more routing rules; and
route the second order information associated with the second order created on the second organization user computing device and received from the second organization user computing device based on the second set of one or more routing rules loaded from the consolidated order management database.

8. The system of claim 7, wherein loading the second set of one or more routing rules from the consolidated order management database comprises selecting the second set of one or more routing rules from the consolidated order management database for use in routing the second order information associated with the second order created on the second organization user computing device and received from the second organization user computing device.

9. The system of claim 8, wherein the second set of one or more routing rules are selected from the consolidated order management database for use in routing the second order information associated with the second order created on the second organization user computing device and received from the second organization user computing device based on second channel information identifying a second channel associated with the second order created on the second organization user computing device and received from the second organization user computing device, the second channel being different from the first channel.

10. The system of claim 8, wherein the second set of one or more routing rules are selected from the consolidated order management database for use in routing the second order information associated with the second order created on the second organization user computing device and received from the second organization user computing device based on second product information identifying a second product associated with the second order created on the second organization user computing device and received from the second organization user computing device, the second product being different from the first product.

11. The system of claim 7, wherein the memory stores additional computer-readable instructions that, when executed by the at least one processor, further cause the system to:
based on routing the second order information associated with the second order created on the second organization user computing device and received from the second organization user computing device based on the second set of one or more routing rules loaded from the consolidated order management database, update second tracking information in the consolidated order management database, the second tracking information being different from the first tracking information.

12. The system of claim 11, wherein the memory stores additional computer-readable instructions that, when executed by the at least one processor, further cause the system to:
after updating the second tracking information in the consolidated order management database, send, via the communication interface, and to the second organization user computing device, the second tracking information.

13. The system of claim 11, wherein the second order information associated with the second order created on the second organization user computing device and received from the second organization user computing device is routed to a second execution entity based on the second set of one or more routing rules loaded from the consolidated order management database, the second execution entity being different from the first execution entity.

14. The system of claim 13, wherein the memory stores additional computer-readable instructions that, when executed by the at least one processor, further cause the system to:
receive, via the communication interface, and from a computing device associated with the second execution entity, second execution information associated with the second order information routed to the second execution entity based on the second set of one or more routing rules loaded from the consolidated order management database; and
update the second tracking information in the consolidated order management database based on the second execution information received from the computing device associated with the second execution entity.

15. A method, comprising:
at a computing platform comprising at least one processor, memory, and a communication interface:
receiving, by the at least one processor, via the communication interface, and from a first organization user computing device, first order information associated with a first order created on the first organization user computing device, wherein the first order created on the first organization user computing device comprises a trade in one or more securities, and wherein the first order information received from the first organization user computing device comprises information identifying the trade in the one or more securities;
validating, by the at least one processor, the first order information associated with the first order created on the first organization user computing device and received from the first organization user computing device based on a first set of one or more validation rules stored in a consolidated order management database;
based on validating the first order information associated with the first order created on the first organization user computing device and received from the first organization user computing device, loading, by the at least one processor, a first set of one or more routing rules from the consolidated order management database;
routing, by the at least one processor, the first order information associated with the first order created on the first organization user computing device and received from the first organization user computing device based on the first set of one or more routing rules loaded from the consolidated order management database; and based on routing the first order information associated with the first order created on the first organization user computing device and received from the first organization user computing device based on the first set of one or more routing rules loaded from the consolidated order management database, updating, by the at least one processor, first tracking information in the consolidated order management database, wherein the first order information associated with the first order created on the first organization user computing device and received from the first organization user computing device is routed to a first execution entity based on the first set of one or more routing rules loaded from the consolidated order management database, wherein routing the first order information associated with the first order created on the first organization user computing device and received from the first organization user computing device to the first execution entity based on the first set of one or more routing rules loaded from the consolidated order management database causes the first execution entity to carry out the trade in the one or more securities, wherein validating the first order information associated with the first order created on the first organization user computing device and received from the first organization user computing device comprises selecting the first set of one or more validation rules stored in the consolidated order management database for validating the first order information associated with the first order, wherein the first set of one or more validation rules stored in the consolidated order management database comprises one or more channel rules for a first channel associated with the first order, and wherein the first set of one or more validation rules stored in the consolidated order management database comprises one or more product rules for a first product associated with the first order.

16. One or more non-transitory computer-readable media storing instructions that, when executed by a computer system comprising at least one processor, memory, and a communication interface, cause the computer system to:

receive, via the communication interface, and from a first organization user computing device, first order information associated with a first order created on the first organization user computing device, wherein the first order created on the first organization user computing device comprises a trade in one or more securities, and wherein the first order information received from the first organization user computing device comprises information identifying the trade in the one or more securities;

validate the first order information associated with the first order created on the first organization user computing device and received from the first organization user computing device based on a first set of one or more validation rules stored in a consolidated order management database;

based on validating the first order information associated with the first order created on the first organization user computing device and received from the first organization user computing device, load a first set of one or more routing rules from the consolidated order management database;

route the first order information associated with the first order created on the first organization user computing device and received from the first organization user computing device based on the first set of one or more routing rules loaded from the consolidated order management database; and based on routing the first order information associated with the first order created on the first organization user computing device and received from the first organization user computing device based on the first set of one or more routing rules loaded from the consolidated order management database, update first tracking information in the consolidated order management database, wherein the first order information associated with the first order created on the first organization user computing device and received from the first organization user computing device is routed to a first execution entity based on the first set of one or more routing rules loaded from the consolidated order management database, wherein routing the first order information associated with the first order created on the first organization user computing device and received from the first organization user computing device to the first execution entity based on the first set of one or more routing rules loaded from the consolidated order management database causes the first execution entity to carry out the trade in the one or more securities, wherein validating the first order information associated with the first order created on the first organization user computing device and received from the first organization user computing device comprises selecting the first set of one or more validation rules stored in the consolidated order management database for validating the first order information associated with the first order, wherein the first set of one or more validation rules stored in the consolidated order management database comprises one or more channel rules for a first channel associated with the first order, and wherein the first set of one or more validation rules stored in the consolidated order management database comprises one or more product rules for a first product associated with the first order.

17. The system of claim 1, wherein the one or more channel rules for the first channel associated with the first order comprise one or more channel rules for a retail brokerage channel, a managed product channel, an online channel, and a retirement channel established by a financial institution operating the system.

18. The system of claim 17, wherein the one or more product rules for the first product associated with the first order comprise one or more product rules for trading in one or more equity products, one or more fixed income products, one or more mutual fund products, and one or more options products.

19. The method of claim 15, wherein the one or more channel rules for the first channel associated with the first order comprise one or more channel rules for a retail brokerage channel, a managed product channel, an online channel, and a retirement channel established by a financial institution operating the computing platform.

20. The method of claim 19, wherein the one or more product rules for the first product associated with the first order comprise one or more product rules for trading in one or more equity products, one or more fixed income products, one or more mutual fund products, and one or more options products.

* * * * *